(12) United States Patent
Robbins

(10) Patent No.: US 8,146,539 B2
(45) Date of Patent: Apr. 3, 2012

(54) METHOD OF REDUCING HERBACEOUS FUELS IN AREAS SUSCEPTIBLE TO WILDFIRES

(75) Inventor: Mark Alan Robbins, Sundance, WY (US)

(73) Assignee: Ridley Block Operations, Inc., Mankato, MN (US)

( * ) Notice: Subject to any disclaimer, the term of this patent is extended or adjusted under 35 U.S.C. 154(b) by 280 days.

(21) Appl. No.: 12/433,331

(22) Filed: Apr. 30, 2009

(65) Prior Publication Data

US 2009/0272334 A1 Nov. 5, 2009

Related U.S. Application Data

(60) Continuation-in-part of application No. 11/304,476, filed on Dec. 14, 2005, now Pat. No. 7,536,979, which is a continuation-in-part of application No. 10/626,293, filed on Jul. 24, 2003, now Pat. No. 7,028,639, and a continuation-in-part of application No. 11/126,376, filed on Jul. 25, 2003, now Pat. No. 7,143,721, said application No. 10/626,293 is a continuation-in-part of application No. 10/395,532, filed on Mar. 24, 2003, now Pat. No. 7,143,720, said application No. 11/126,376 is a continuation-in-part of application No. 10/395,532, filed on Mar. 24, 2003, now Pat. No. 7,143,720, which is a continuation of application No. 10/059,806, filed on Jan. 28, 2002, now Pat. No. 6,561,133, which is a continuation of application No. 09/745,609, filed on Dec. 21, 2000, now Pat. No. 6,390,024, which is a division of application No. 09/266,176, filed on Mar. 10, 1999, now Pat. No. 6,244,217.

(51) Int. Cl.
*A01K 15/00* (2006.01)

(52) U.S. Cl. .......................................... 119/712; 119/174
(58) Field of Classification Search .................. 119/712, 119/174, 51.01; 47/1.01 R, 1.01 F, 1.43, 47/58.1 R
See application file for complete search history.

(56) References Cited

U.S. PATENT DOCUMENTS

| D61,520 S | 9/1922 | Michalski |
|---|---|---|
| 2,576,154 A | 11/1951 | Trautvetter |
| 2,801,609 A | 8/1957 | Webster |
| 3,259,106 A | 7/1966 | Ray et al. |
| 3,500,795 A | 3/1970 | Towlerton |
| 3,972,307 A | 8/1976 | Marseillan |
| 4,329,940 A | 5/1982 | Humphries |

(Continued)

OTHER PUBLICATIONS

Bailey et al, Modifying livestock grazing distribution by strategic placement of cooked molasses supplements, Jan. 1998, Journal of Animal Science vol. 76 Suppl 1.*

(Continued)

*Primary Examiner* — Kristen Hayes
(74) *Attorney, Agent, or Firm* — Dorsey & Whitney LLP

(57) ABSTRACT

A method of reducing herbaceous fuels may include identifying a region to reduce herbaceous fuels, dividing the region into susceptible areas, placing the susceptible areas in an order, and introducing an ingestible into a first susceptible area in the order. The method may also include selecting an ungulate group and the ingestible may be highly palatable, portable, and self-limiting. Placing the susceptible areas in an order may include analyzing the susceptible areas for a level of susceptibility, prioritizing the susceptible areas based on each area's conditions and surroundings, and/or considering practical aspects of treating all of the susceptible areas of the region. The ingestible may be moved throughout the region to reduce herbaceous fuels.

26 Claims, 16 Drawing Sheets

U.S. PATENT DOCUMENTS

| | | | |
|---|---|---|---|
| 4,333,956 | A | 6/1982 | Juengst et al. |
| 4,338,336 | A | 7/1982 | Glabe et al. |
| 4,463,706 | A | 8/1984 | Meister et al. |
| 4,784,086 | A | 11/1988 | Hand et al. |
| 4,986,220 | A | 1/1991 | Reneau et al. |
| 5,050,539 | A | 9/1991 | Liegner |
| 5,406,909 | A | 4/1995 | Wenstrand |
| 5,526,773 | A | 6/1996 | Richardson |
| 5,572,954 | A | 11/1996 | Elkins |
| 5,622,739 | A | 4/1997 | Benton et al. |
| 5,637,312 | A | 6/1997 | Tock et al. |
| 5,758,598 | A | 6/1998 | Rothert |
| 5,862,777 | A | 1/1999 | Sweeney |
| 5,901,660 | A | 5/1999 | Stein |
| 6,053,124 | A | 4/2000 | Kolbe |
| 6,117,458 | A | 9/2000 | Morgan |
| 6,153,230 | A | 11/2000 | Corley, Jr. |
| 6,244,217 | B1 | 6/2001 | Robbins |
| 6,257,288 | B1 | 7/2001 | Davidian et al. |
| 6,337,097 | B1 * | 1/2002 | Sun et al. ............ 426/102 |
| 6,390,024 | B2 | 5/2002 | Robbins |
| 6,561,133 | B2 | 5/2003 | Robbins |
| 6,854,420 | B2 | 2/2005 | Crocker |
| 2003/0188694 | A1 | 10/2003 | Robbins |
| 2005/0081792 | A1 | 4/2005 | Robbins |
| 2005/0193955 | A1 | 9/2005 | Robbins |

OTHER PUBLICATIONS

Aussibal et al., "A Way of Recovering Woodland and Heathland for Pastoral Farming in a Game and Wildlife Reserve Area", Recontres Autour des Recherches Sur Les Ruminants, Paris, France, pp. 399.
Author Unknown, "Cow behavior studied to protect enviornment", Environmental News Network, http://www.enn.com/news/enn-stories/1998/08/081898/, 2 pages, Aug. 18, 1998.
Author Unknown, "BGF-30", Crystalyx Brand Supplements, Hubbard Feeds, Inc., 2 pages, May 1998.
Author Unknown, "Managing Livestock Grazing on Meadows of California's Sierra Nevada: A Manager-User Guide", Cooperative Extension, University of California, Division of Agriculture and Natural Resources, Leaflet 21421, pp. 1-9, at least as early as Mar. 10, 1999.
Author Unknown, "Utilization Gauge", U.S. Forest Service Rocky Mountain Forest and Range Experiment Station, American Slide-Chart Corporation, Wheaton, Illinois, 4 pages, 1980.
Bailey, Derek W., "Effectiveness of Low-Moisture Molasses Blocks and Conventional Formulations for Delivering Supplemental Minerals to Cattle on Rangelands", 31 pages, Final Report conducted on Apr. 15, 2001.
Bailey et al., "Management of Cattle Distribution", Rangelands, vol. 11, No. 4, pp. 159-161, Aug. 1989.
Bailey et al., "Modifying livestock grazing distribution by strategic placement of cooked molasses supplements", Journal of Animal Science, vol. 76, Supplement 1, Journal of Dairy Science, vol. 81, Supplement 1, p. 191, Jan. 1998.
Bell, Hershel M., "Rangeland Management for Livestock Production", University of Oklahoma Press, pp. 190-216, 1973.
Blezinger, Stephen, "Taking a Look at Liquid Feeds for Growing Cattle", Cattle Today Online, www.cattletoday.com/, 5 pages, 1998-2001.
Bowman et al., "Influence of Liquid Supplement Delivery Method on Forage and Supplement Intake of Grazing Beef Cows", Animal Feed Science and Technology, vol. 78, No. 3-4, pp. 273-285, 1999.
Brewer, Tracy, "Use of Dehydrated Molasses Blocks to Promote Uniform Utilitzation Between Burned and Unburned Areas of a Summer Pasture 2 Years Post-Burn", 16 pages, Study conducted on Nov. 27, 2002.
Brochure, "Crystalyx Brand Supplements: Go with the brand you know", Hubbard Feeds, Inc., pp. 1-15, at least as early as Mar. 10, 1999.
Brochure, "New Tools to Distribute Grazing", Beef NutriTech, Hubbard Feeds, Inc., 4 pages, at least as early as Mar. 10, 1999.
Bryant, Larry D., "Response of Livestock to Riparian Zone Exclusion", Journal of Range Management, vol. 35, No. 6, pp. 780-785, Nov. 1982.
Cook, C. Wayne, "Factors Affecting Utilization of Mountain Slopes by Cattle", Department of Range Science, Utah State University, Logan, pp. 200-204, at least as early as Mar. 10, 1999.
Crane et al., "Influence of Cattle Grazing on Elk Habitat Selection", Proceedings, Western Section American Society of Animal Science, vol. 52, pp. 160-164, 2001.
George et al., "Practices and Strategies for Reducing Nonpoint Source Pollution and Protecting Biodiversity", http://agronomy.ucdavis.edu/CALRNG/Project%20Descriptions/Practices.htm., 4 pages, 1998.
Gillen et al., "Cattle Distribution on Mountain Rangeland in Northeastern Oregon", Journal of Range Management, vol. 37, No. 6, pp. 549-553, Nov. 1984.
Hirschenberger, George, "Can cattle, sheep and goats be used to manage spotted knapweed?", The Quarterly Steward, Bureau of Land Management, Montana/Dakotas, pp. 3-4, Fall 2005.
Holechek, Jerry L., "An Approach for Setting the Stocking Rate", Rangelands, vol. 10, No. 1, pp. 10-14, Feb. 1988.
Kauffman et al., "Impacts of Cattle on Strambanks in Northeastern Oregon", Journal of Range Management, vol. 36, No. 6, pp. 683-685, Nov. 1983.
Kauffman et al., "Livestock Impacts on Riparian Ecosystems and Streamside Management Implications . . . A Review", Journal of Range Management, vol. 37, No. 5, pp. 430-438, Sep. 1984.
Martin et al., "Salt and Meal-Salt Help Distribute Cattle Use on Semidesert Range", Journal of Range Management, vol. 26, No. 2, pp. 94-97, Mar. 1973.
McDougald et al., "Use of Supplemental Feeding Locations to Manage Cattle Use on Riparian Areas of Hardwood Rangelands", USDA Forest Service Gen. Tech. Rep., PSW-110, pp. 124-126, 1989.
Roath et al., "Cattle Grazing and Behavior on a Forested Range", Journal of Range Management, vol. 35, No. 3, pp. 332-338, May 1982.
Savory, Allan, "Holistic Resource Management", Library of Congress Cataloging-in-Publication Data, pp. 250-263, 1988.
Smith et al., "Declining forage availability effcts on utilization and community selection by cattle", Journal of Range Management, vol. 45, pp. 391-395, Jul. 1992.
Uniblock Cattle Minerla, www.uniblokcanada.com/MineralAnalysis.htm, 2 pages, 2002.
Vallentine, John F., "Grazing Management", Academic Press, Inc., pp. 76-105, 1990.
Warnert, Jeannette, "UC Scientists Use Observation to Study Cow Behavior", http://www.uckac.ed/press/pressreleases98/cowbehavior.htm, 2 pages, Aug. 10, 1998.
Influence of Cattle Grazing On Elk Forage Conditions and Habitat Selection, K. K. Crane, et al., Proceedings, Western Section, American Society of Animal Science, vol. 52 (2001).

* cited by examiner

```
┌─────────────────────────────────────────────────────────────┐
│ Identify a target area in a foraging area, wherein the      │
│ target area includes a noxious plant specie.                │
│                      (block 300)                            │
└─────────────────────────────────────────────────────────────┘
                              ⇩
┌─────────────────────────────────────────────────────────────┐
│ Select an ungulate specie to interact with the noxious      │
│ plant specie.                                               │
│                      (block 305)                            │
└─────────────────────────────────────────────────────────────┘
                              ⇩
┌─────────────────────────────────────────────────────────────┐
│ Select a treatment period, wherein the ungulate specie      │
│ interacts with the noxious plant specie in the target area. │
│                      (block 310)                            │
└─────────────────────────────────────────────────────────────┘
                              ⇩
┌─────────────────────────────────────────────────────────────┐
│ Provide an ingestible at a first deployment location in     │
│ the target area.                                            │
│                      (block 315)                            │
└─────────────────────────────────────────────────────────────┘
                              ⇩
┌─────────────────────────────────────────────────────────────┐
│ The selected ungulate specie is introduced to the animal    │
│ feed supplement located at the first deployment location    │
│ in the target area.                                         │
│                      (block 320)                            │
└─────────────────────────────────────────────────────────────┘
```

FIG. 10

EXEMPLARY PRIORITIZATION

| Area | Priority # | Relevant Criteria |
|---|---|---|
| C | 1 | Mod. Susceptibility; Housing; Adj. to Imp. Fac.; Fire Pathway |
| D | 2 | High Susceptibility; Near Imp. Fac.; Fire Pathway |
| B | 3 | Low Susceptibility; Adj. to Res. Area; Fire Pathway |
| A | 4 | Mod. Susceptibility; Near Res. Area; Fire Pathway |
| G | 5 | High Susceptibility |
| H | 6 | High Susceptibility |
| K | 7 | High Susceptibility |
| L | 8 | High Susceptibility |
| P | 9 | High Susceptibility |
| O | 10 | Mod. Susceptibility |
| E | 11 | Low Susceptibility |
| F | 12 | Low Susceptibility |
| I | 13 | Low Susceptibility |
| J | 14 | Low Susceptibility |
| M | 15 | Low Susceptibility |
| N | 16 | Low Susceptibility |

FIG. 16

EXEMPLARY SUSCEPTIBILITY

| Area | Susceptibility |
|---|---|
| D | HIGH |
| G | HIGH |
| H | HIGH |
| K | HIGH |
| L | HIGH |
| P | HIGH |
| A | MODERATE |
| C | MODERATE |
| O | MODERATE |
| B | LOW |
| E | LOW |
| F | LOW |
| I | LOW |
| J | LOW |
| M | LOW |
| N | LOW |

FIG. 15

EXEMPLARY ORDER

| Order | HERD I | HERD II | HERD III |
|---|---|---|---|
| FIRST | C | D | B |
| SECOND | A | G | H |
| THIRD | K | L | P |
| FOURTH | O | E | F |
| FIFTH | I | J | M |
| SIXTH | N | | |

FIG. 17

EXEMPLARY ORDER

| Order | HERD I | HERD II | HERD III |
|---|---|---|---|
| FIRST | C | D | B |
| SECOND | G | H | A |
| THIRD | K | L | E |
| FOURTH | O | P | F |
| FIFTH | M | N | J |
| SIXTH | I | | |

FIG. 18

EXEMPLARY ORDER

| ORDER | |
|---|---|
| FIRST | D |
| SECOND | C |
| THIRD | B |
| FOURTH | A |
| FIFTH | E |
| SIXTH | F |
| SEVENTH | G |
| EIGHTH | H |
| NINTH | L |
| TENTH | K |
| ELEVENTH | P |
| TWELFTH | O |
| THIRTEENTH | J |
| FOURTEENTH | N |
| FIFTEENTH | M |
| SIXTEENTH | I |

FIG. 19

EXEMPLARY IMPLEMENTATION OVER A 6 WEEK PERIOD WITH THREE HERDS

| AREA | WEEK 1 | WEEK 2 | WEEK 3 | WEEK 4 | WEEK 5 | WEEK 6 |
|---|---|---|---|---|---|---|
| A | | HERD III | | | | |
| B | HERD III | | | | | |
| C | HERD I | | | | | |
| D | HERD II | | | | | |
| E | | | HERD III | | | |
| F | | | | HERD III | | |
| G | | HERD I | | | | |
| H | | HERD II | | | | |
| I | | | HERD I | | | |
| J | | | HERD II | | | |
| K | | | HERD I | | | |
| L | | | HERD II | | | |
| M | | | | | HERD III | |
| N | | | | | | HERD I |
| O | | | | HERD I | HERD I | |
| P | | | | HERD II | HERD II | |

FIG. 20

METHOD OF REDUCING HERBACEOUS FUELS IN AREAS SUSCEPTIBLE TO WILDFIRES

CROSS-REFERENCE TO RELATED APPLICATIONS

The present application is a continuation-in-part ("CIP") application of, and claims priority to, U.S. patent application Ser. No. 11/304,476 ("the '476 application") filed on Dec. 14, 2005 and issued May 26, 2009 as U.S. Pat. No. 7,536,979. The '476 application is a CIP application of, and claims priority to, U.S. patent application Ser. Nos. 10/626,293 ("the '293 application") and 11/126,376 ("the '376 application"). The '293 application was filed Jul. 24, 2003 and issued Apr. 18, 2006 as U.S. Pat. No. 7,028,639. The '376 application was filed Jul. 25, 2003 and issued Dec. 5, 2006 as U.S. Pat. No. 7,143,721. The '293 application and the '376 application are both CIP applications of U.S. patent application Ser. No. 10/395,532 ("the 532 application"), which was filed Mar. 24, 2003 and issued Dec. 5, 2006 as U.S. Pat. No. 7,143,720. The '532 application is a continuation application of U.S. patent application Ser. No. 10/059,806, filed Jan. 28, 2002 and issued May 13, 2003 as U.S. Pat. No. 6,561,133, which is a continuation application of U.S. patent application Ser. No. 09/745,609, filed Dec. 21, 2000 and issued May 21, 2002 as U.S. Pat. No. 6,390,024, which is divisional application of U.S. patent application Ser. No. 09/266,176, filed Mar. 10, 1999 and issued Jun. 12, 2001 as U.S. Pat. No. 6,244,217. All of the aforementioned applications and patents are hereby incorporated by reference in their entireties.

FIELD OF THE INVENTION

The present invention relates generally to a method of managing foraging areas. More particularly, the present invention relates to a method of using an animal feed supplement to manage foraging areas.

BACKGROUND OF THE INVENTION

Proper management of foraging areas is important to maximize animal carrying capacity, encourage animal vitality/health, and to preserve the environment. Three issues facing those who manage foraging areas include (1) the location of wild ungulate foraging, (2) the proliferation of noxious plants, including those plants classified as an invasive species, and (3) the existence of herbaceous fuels in areas susceptible to wildfires.

With respect to the first issue facing those who manage foraging areas, wild ungulates, such as elk, deer, bison, etc., forage where they find foraging conditions to be most suitable. Consequently, the natural foraging distribution of wild ungulates may encompass some foraging areas and not others. Thus, some foraging areas will have many wild ungulates, while other foraging areas will have few or none.

Individuals and groups, such as ranchers, farmers, wildlife enthusiasts, environmentalists, state and national wildlife agencies, and state and national land management agencies, concern themselves with the natural foraging distribution of wild ungulates in various foraging areas. For example, farmers prefer that the foraging distribution of wild ungulates does not encompass their fields when their crops are first sprouting in the springtime. To prevent the transmission of disease from wild ungulates to livestock, as can occur between bison infected with brucellosis and cattle, ranchers prefer that the foraging distribution of wild ungulates does not encompass the grazing area of their livestock. Wildlife enthusiasts and park managers prefer that the foraging distribution of wild ungulates encompasses less remote areas to facilitate the viewing of wild ungulates, thereby increasing appreciation for wild ungulates and nature.

In view of the preceding discussion, it is clear that there is a need in the art for a method of modifying the natural foraging distribution of wild ungulates.

With respect to the second issue facing those who manage foraging areas, noxious weeds, and especially non-native noxious weeds or invasive plant species, have become a significant problem throughout North America and other parts of the world. A plant becomes an invasive specie by being transferred through artificial means (usually human action) to locations where the plant has no natural inhibitors to the plant's proliferation (e.g., the location lacks animals that naturally graze the plant, diseases or insect enemies that naturally afflict the plant, etc.). A classic example of an invasive species is the prickly pear (*Opuntia stricta*), which overran vast areas of Australia until a moth (*Cactoblastis cactorum*) was introduced, eliminating more than 90% of the prickly pear infestation within 10 years.

Invasive species disturb natural ecosystems, displacing species native to the location and causing harm. In some areas, invasive plant species have resulted in an environmental disaster, wherein one or more invasive plant species have crowded out native plants to the point of extinction. For example, in parts of western Montana, spotted knapweed (*Centaurea maculosa*) has spread to the point that some areas are nearly devoid of native grasses. A similar situation exists in southwest South Dakota and northeast Wyoming with respect to leafy spurge (*Euphorbia esula*).

Once established in an area, invasive plant species quickly spread and crowd out native plant species. As result, native plant species are significantly reduced or made extinct in the area, thereby reducing the area's ability to support wild and domestic animals that depend on the native plant species for food and shelter.

Chemical herbicides are useful in the control, reduction and eradication of noxious weeds, including invasive species. However, because plant seeds often fall to the ground and delay sprouting for several years, chemical herbicides, and all other weed control methods, must be faithfully applied year after year in an area to control, reduce and eventually eradicate the noxious weeds. Where the areas of noxious weed infestation are great in size and concentration, the repeated application of herbicides can be very expensive. For example, it is estimated Missoula County, in western Montana, has over 600,000 acres of noxious weeds and that it would take $12 to $14 million per year from 2005 to 2020 to eradicate the county's noxious weeds. Not only is such an effort cost prohibitive, but the application of such large and continuous amounts of chemical herbicide would likely have adverse environmental and health consequences.

To avoid the cost, health and environmental drawbacks associated with combating spotted knapweed via chemical herbicides, Missoula County has turned other methods of weed control including the introduction of biological control agents, seeding with weed resistant grasses, inter-seeding weedy areas, and controlled grazing with ungulates, such as cattle, sheep and goats. Each of these methods of weed control has its own drawbacks. For example, with respect the two seeding methods, plant seed is very expensive to purchase and plant. This expense can be cost prohibitive when having to seed large areas annually.

With respect to the biological control agent method, Missoula County has introduced the knapweed seed head fly (*Urophora affinis* and *U. quadrifasciata*), the lesser nap weed flower weevil (*Larinus minutus*), the knapweed root weevil (*Cyphocleonus acbates*), and the yellow winged knapweed root weevil (*Agapeda zoegana*). Each of these insects naturally afflicts spotted knapweed. However, introducing such biological control agents has risks of its own where the biological control agent is non-native and, as a result, could itself become an invasive species.

With respect to the grazing methods, ungulates (e.g., cattle, sheep and goats) will graze on spotted knapweed during certain stages of the plant's existence. To achieve any weed control benefit from the ungulates' willingness to graze upon spotted knapweed, herders have been employed to maintain the ungulates in the spotted knapweed areas of a grazing area in order to get the ungulates to sufficiently focus their grazing activities on the spotted knapweeds. Unfortunately, herding is very labor intensive. Also, ungulates are adverse to being pushed or forced into a spotted knapweed patch in the spotted knapweed areas of a pasture, thereby making it difficult to achieve optimum weed control benefit from concentrating the ungulates on the spotted knapweed patches.

In view of the preceding discussion, it is clear that there is a need in the art for a method of controlling noxious plant species that is safe, cost effective, of low labor intensity, and optimizes the control, reduction and eventual eradication of the noxious plant species.

With respect to the third issue facing those who manage foraging areas, wildfires are an ever increasing concern. These concerns relate not only to the occurrence of fire, but also the costs of fighting them. A recent five-part Los Angeles Times series on the costs and futility of fighting fires won a Pulitzer Prize. "In their wildfire articles, reporters Bettina Boxall and Julie Cart reported that costly aerial drops of water and retardant often were ordered against firefighters' better judgment because they "make good television" and helped win political points for local officials." Susman, Tina, "Pulitzers recognize the public watchdogs," Los Angeles Times, Apr. 21, 2009. "The tab for one day of fire fighting was more than $2.5 million. Despite such expenses, the series showed, fire protection policies were not working, and bigger, deadlier fires were raging." Id. In light of these futile efforts and their associated costs, an alternative and more proactive approach is needed.

One known problem or factor in the fuels available for forest fires relates to the tendency, mentioned above, of wild ungulates to forage where they find foraging conditions to be most suitable. This may leave many non-cultivated areas overgrown. One of these tendencies, which may exacerbate the problem, may be for wild ungulates to prefer new sprouting growth, leaving cured growth untouched and increasingly susceptible to wild fires. The tendency to forage in suitable areas is seen in domestic ungulates as well, where they may focus on lowland riparian areas. This tendency may also exacerbate the problem of wildfires because the highland areas, which may be naturally drier, are the areas that may become overgrown. In addition to the natural tendency of ungulates to forage where it is most suitable, the infiltration of noxious and/or invasive plant species may cause ungulates, wild or domestic, to avoid additional areas of potential foraging. Consequently, these overgrowth areas may be susceptible to wildfires. This may be especially true during dry conditions.

In view of the preceding discussion, it may be apparent that there is a need in the art for a method of controlling ungulate grazing patterns to reduce herbaceous fuels in areas susceptible to wild fires.

BRIEF SUMMARY OF THE INVENTION

The present invention, in one embodiment, is a method of using a plurality of domestic ungulates to precondition a foraging area to enhance the attractiveness of the foraging area to a plurality of wild ungulates. The method comprises selecting the foraging area to be preconditioned, selecting a target period, selecting a preconditioning period, and providing at least one highly palatable, portable, self-limiting, animal feed supplement in the foraging area during the preconditioning phase. The target period is when the plurality of wild ungulates uses the foraging area once it has been preconditioned by the domestic ungulates. The preconditioning period is when the plurality of domesticated ungulates preconditions (i.e., forages in) the foraging area for subsequent use by the wild ungulates during the target period. The highly palatable, portable, self-limiting, animal feed supplement attracts the plurality of domesticated ungulates to the foraging area and increases the length of stay of the plurality of domesticated ungulates in the foraging area.

During the preconditioning period, when the domesticated ungulates forage in the foraging area, the domesticated ungulates remove the old forage and deposit manure throughout the foraging area. Because the old forage has been removed, the ratio of new forage to old forage is increased after a subsequent growth period. Also, because manure has been distributed throughout the foraging area, the new forage grows more vigorously during a subsequent growth period. As a result, because of the preconditioning, the foraging area ends up being more attractive to wild ungulates than it would otherwise be without preconditioning.

The present invention, in another embodiment, is a method of modifying a wild ungulate foraging distribution. The method comprises selecting a foraging area to be encompassed by the wild ungulate foraging distribution and supplying in the foraging area an ingestible adapted to be ingested by a preconditioning ungulate. The ingestible attracts the preconditioning ungulate to the foraging area and increases the dwell time of the preconditioning ungulate within the foraging area. In one embodiment, the preconditioning ungulates may be cattle, sheep, goats, lamas or horses. In another embodiment, the preconditioning ungulates may be domesticated or semi-domesticated elk, deer, bison or wild horses. In one embodiment, the wild ungulates may be elk, deer, bison or wild horses.

The present invention, in another embodiment, is a preconditioned foraging area enhanced by a domestic ungulate to be more attractive to a wild ungulate. The foraging area comprises a foraging area and a highly palatable, portable, self-limiting, animal feed supplement located in the foraging area. The animal feed supplement is adapted to attract the domestic ungulate to the foraging area and to increase a length of stay of the domestic ungulate in the foraging area.

The present invention, in another embodiment, is a preconditioned forage area attractive to wild ungulates as a source of young growth forage. The preconditioned forage area has a predetermined grazing level produced by providing at least one highly palatable, portable, self-limiting, animal feed supplement in the preconditioned foraging area. The preconditioned foraging area is accessible to wild ungulates but distinct from foraging areas habitually frequented by such wild ungulates. The at least one animal feed supplement is provided in the preconditioned foraging area in advance of a forage growing season and for a period of time sufficient for a plurality of domesticated ungulates to precondition the foraging area. The at least one animal feed supplement is adapted to attract the plurality of domesticated ungulates to the preconditioned foraging area and to increase a length of stay of the domesticated ungulates in the preconditioned foraging area.

The present invention, in another embodiment, is a method of controlling noxious plant species. The method comprises identifying a target area in a foraging area, selecting a treatment period, selecting an ungulate specie, providing an animal feed supplement at a first deployment location in the target area, and introducing the selected ungulate specie to the animal feed supplement in the target area during the treatment period. The target is considered such because it includes a noxious plant specie. During the treatment period, the selected ungulate specie will interact with the noxious plant specie in the target area. For example, the ungulates interact with the noxious plant specie by eating the noxious plant specie and/or by trampling the noxious plant specie. The animal feed supplement is highly-palatable, portable, self-limiting, attracts the ungulate specie to the target area, and increases the length of stay of the ungulate specie in the target area. In one embodiment, the feed supplement is tailored for the nutritional needs of the selected ungulate specie and/or the taste preferences of the selected ungulate specie.

In one embodiment, the selection of the treatment period is coordinated with a stage of the noxious plant specie that offers an increased likelihood the ungulates will graze on the noxious plant specie. In one embodiment, the selection of the treatment period is coordinated to decrease the likelihood the noxious plant specie will propagate. For example, the selection of the treatment period is coordinated to precede the noxious plant specie going to seed, or the selection of the treatment period is coordinated to precede a reproduction stage of the noxious plant specie.

In one embodiment, the selected ungulate specie is a domestic ungulate. Examples of such a domestic ungulate include cattle, sheep, goats, lamas, horses, mules, and donkeys. In one embodiment, the selected ungulate specie is a wild ungulate. Examples of such a wild ungulate include elk, deer, bison, horses, sheep, goats, and antelope.

In one embodiment, the feed supplement is moved from the first deployment location to a second deployment location within the target area. In one embodiment, one or both of the deployment locations are patches having a concentration of the noxious plant specie that is relatively high as compared to the rest of the target area.

The present invention, in one embodiment, is a method of controlling noxious plant species. The method comprises recognizing that a noxious plant specie exists in at least one location within a foraging area, selecting an ungulate to impact the noxious plant specie, determining a proper period for the ungulate to impact the noxious plant specie, and providing an ingestible in close proximity to the at least one location of the noxious plant specie, wherein the ingestible increases the amount of time the ungulate spends in close proximity to the at least one location, and introducing the ungulate to the ingestible.

In one embodiment, the ingestible is a highly palatable, portable, self-limiting, animal feed supplement. In one embodiment, the ingestible is selected from the group consisting of chemical blocks, protein blocks, pressed blocks and liquid feed supplements. In one embodiment, the ingestible is selected from the group consisting of water, livestock cake, beet pulp, grain, silage, hay, and straw.

In one embodiment, the ingestible is selected from the group consisting of mineral blocks, granular mineral supplements, salt blocks, and granular salt supplements.

In one embodiment, the period is coordinated to decrease the likelihood the noxious plant specie will propagate. For example, in one embodiment, the period is coordinated to precede a reproduction stage of the noxious plant specie.

In one embodiment, the ungulates interact with the noxious plant specie by eating the noxious plant specie and/or by trampling the noxious plant specie.

The present invention, in one embodiment, is a method of increasing an ungulate's ingestion of a noxious plant specie in a foraging area. The method comprises placing an ingestible near the noxious plant specie such that the ingestible increases the amount of time the ungulate spends near the noxious plant species.

The present invention, in one embodiment, is a method of reducing herbaceous fuels. The method may be consistent with a predetermined plan that includes a map of a region divided into wildfire susceptible areas and including an order for addressing the areas. The method may include introducing an ingestible palatable to an available ungulate population in at least a first wildfire susceptible area in the order and displacing the ungulate population to the at least a first wildfire susceptible area, the ungulate population being attracted to consume the herbaceous fuels in the at least a first wildfire susceptible area in an amount sufficient to reduce the risk of wildfire in that area. In another embodiment, the method may also include monitoring the at least one wildfire susceptible area for reduction of herbaceous fuels. In another embodiment, the method may include moving the ingestible to a second susceptible area in the order. In another embodiment, the ingestible may be portioned to hold the ungulate population for a predetermined time. In another embodiment, the method may include introducing a second ingestible palatable to an available ungulate population in at least a second wildfire susceptible area in the order and causing the ungulate population to be attracted to and consume the herbaceous fuel in the at least a second wildfire susceptible area thereby reducing the risk of wildfire in that area. In another embodiment, the method may include developing the predetermined plan, wherein developing the predetermined plan may include developing an area map with a plurality of regions and identification by region of the available ungulate populations and herbaceous fuels for fueling a wildfire, identifying a region on the map with herbaceous fuels to be reduced, dividing the region into wildfire susceptible areas, and placing the wildfire susceptible areas in an order for reduction of fuel. In another embodiment, placing the susceptible areas in an order may include analyzing the susceptible areas for a level of susceptibility. In another embodiment, placing the susceptible areas in an order includes developing prioritization criteria. In another embodiment, placing the susceptible areas in an order includes prioritizing the susceptible areas based on the prioritization criteria. In another embodiment, placing the susceptible areas in an order includes considering practical aspects of treating all of the susceptible areas of the region.

While multiple embodiments are disclosed, still other embodiments of the present invention will become apparent to those skilled in the art from the following detailed description, which shows and describes illustrative embodiments of the invention. As will be realized, the invention is capable of modifications in various obvious aspects, all without departing from the spirit and scope of the present invention. Accordingly, the drawings and detailed description are to be regarded as illustrative in nature and not restrictive.

BRIEF DESCRIPTION OF THE DRAWINGS

FIG. 10 is a flow diagram illustrating one embodiment of the method.

FIG. 15 is an exemplary susceptibility schedule of the wildfire susceptible areas of FIG. 14.

FIG. 16 is an exemplary prioritization schedule of the wildfire susceptible areas of FIG. 14.

FIGS. 17, 18, and 19 are exemplary orders of reducing herbaceous fuels in the susceptible areas of FIG. 14.

FIG. 20 is an exemplary implementation of a method of reducing herbaceous fuels according to certain embodiments.

DETAILED DESCRIPTION OF THE INVENTION

Figure 1:
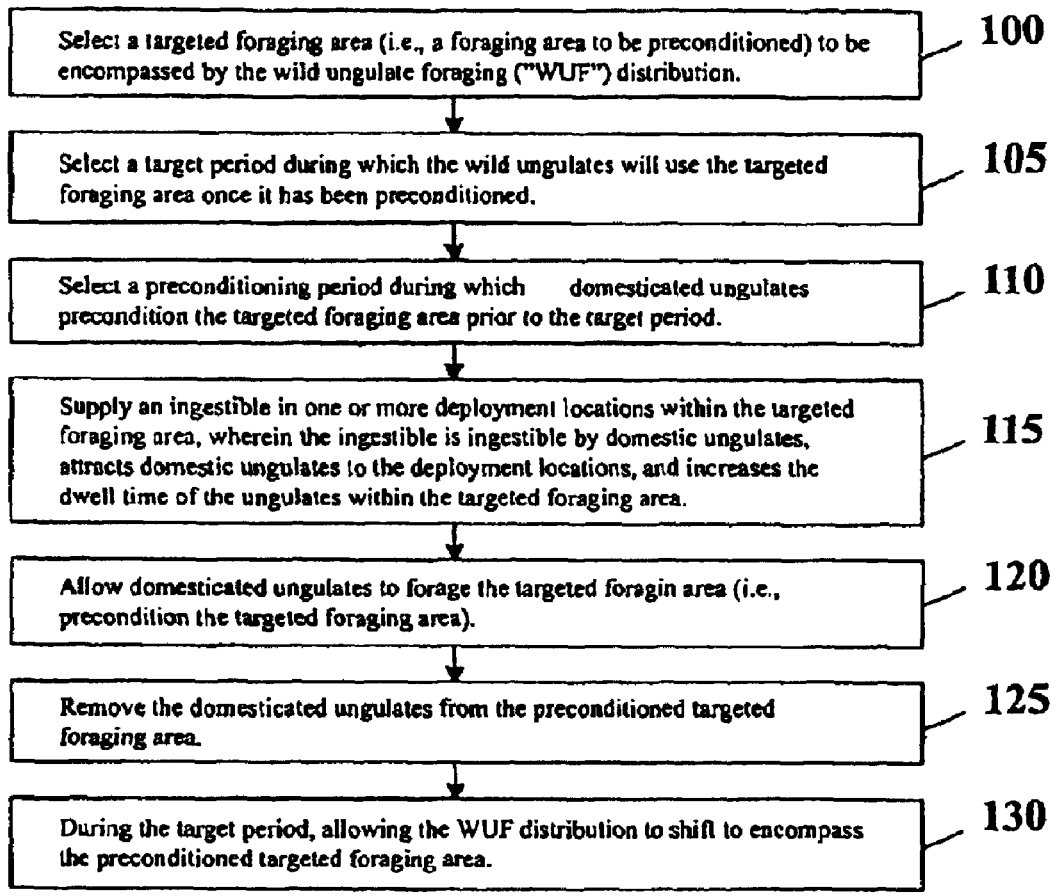
FIG. 1 is a flow diagram illustrating one embodiment of the method.

This specification discloses methods of modifying the natural foraging distribution of ungulates. A first embodiment of the invention is a method of modifying the natural foraging distribution of wild ungulates. Specifically, the method entails preconditioning a foraging area with domesticated ungulates to enhance its attractiveness to wild ungulates, thereby shifting the wild ungulate foraging distribution ("WUF distribution") to encompass the preconditioned foraging area.

A second embodiment of the invention is a method of modifying the natural foraging distribution of ungulates (domestic and/or wild) to focus their foraging activities in areas having noxious weeds (e.g., invasive plant species). The focused foraging activities are used to eradicate or control the noxious weeds and assist in the reestablishment of native plant species.

A third embodiment of the invention is a method of modifying the natural foraging distribution of ungulates (domestic and/or wild) to focus their foraging activities in areas susceptible to wildfires. The focused foraging activities may be used to reduce overgrowth and/or growth, thereby reducing herbaceous fuels.

1. Modifying Natural Foraging Distribution of Wild Ungulates

As indicated in the flow diagram depicted in FIG. 1 and as will be explained in greater detail later in this specification, in one embodiment, the method of modifying the natural foraging distribution of wild ungulates is as follows. A foraging area is selected to be encompassed by the WUF distribution (block 100). This foraging area becomes the targeted foraging area (i.e., the foraging area to be preconditioned). A target period is selected during which the wild ungulates will use the targeted foraging area once it has been preconditioned (block 105). A preconditioning period is selected during which domesticated ungulates precondition the targeted foraging area prior to the target period (block 110). During the preconditioning period, an ingestible is supplied in one or more deployment locations within the targeted foraging area, and domesticated ungulates forage the targeted foraging area (blocks 115 and 120). The ingestible is ingestible by domestic ungulates, attracts domestic ungulates to the deployment locations, and increases the dwell time of the domestic ungulates within the targeted foraging area. After the preconditioning is completed, the domestic ungulates may be removed from the targeted foraging area (block 125). During the target period, the WUF distribution shifts to encompass the targeted foraging area, which has been preconditioned by the domestic ungulates' foraging (block 130). The WUF distribution shifts because of the wild ungulates' preference for the preconditioned forage, in particular, the young, fresh growth that follows grazing of old, cured forage.

Figure 2:
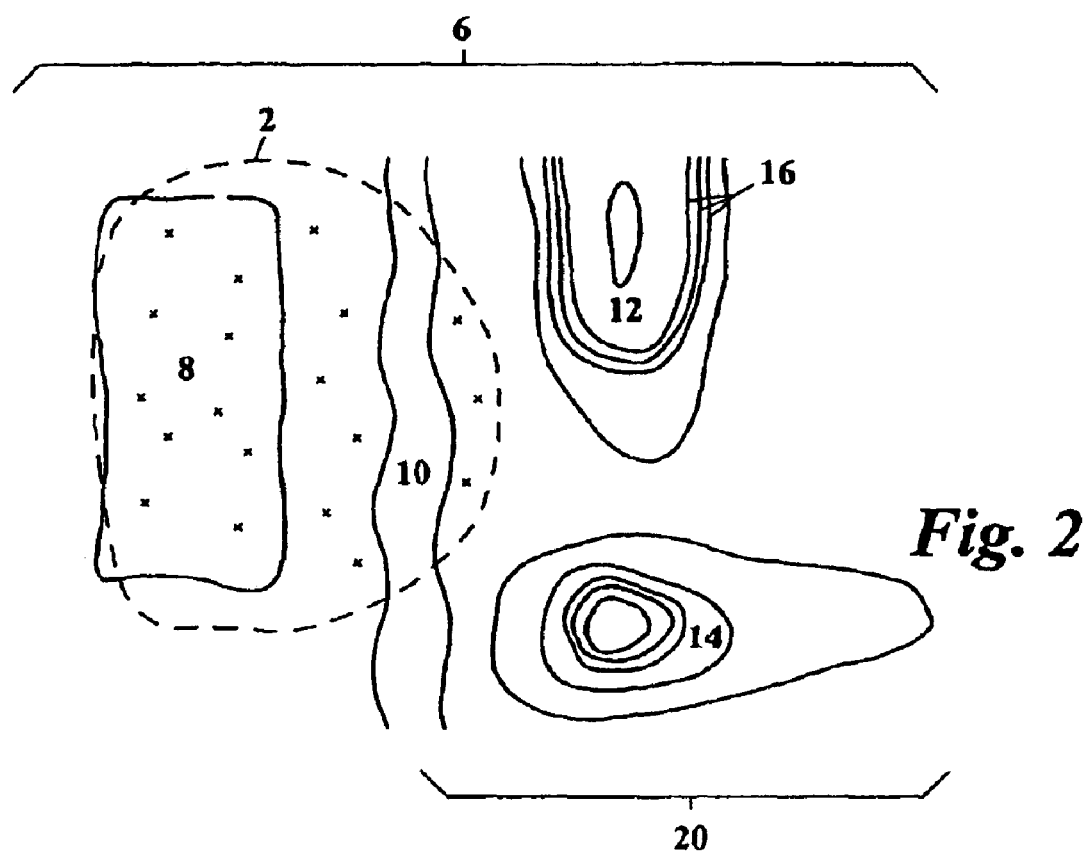
FIG. 2 is a topographic map showing the unmodified natural wild ungulate foraging distribution in a foraging area in the springtime.

The method, in one embodiment, will now be explained by referring to a series of topographical maps (FIGS. 2, 3 and 4) that illustrate how the WUF distribution is shifted away from a field, thereby reducing wild ungulate foraging pressure ("WUF pressure") on the field in the springtime. FIG. 2 is a topographic map showing the unmodified natural WUF distribution 2 (shown in phantom) in a foraging area 6 in the springtime.

Figure 3:
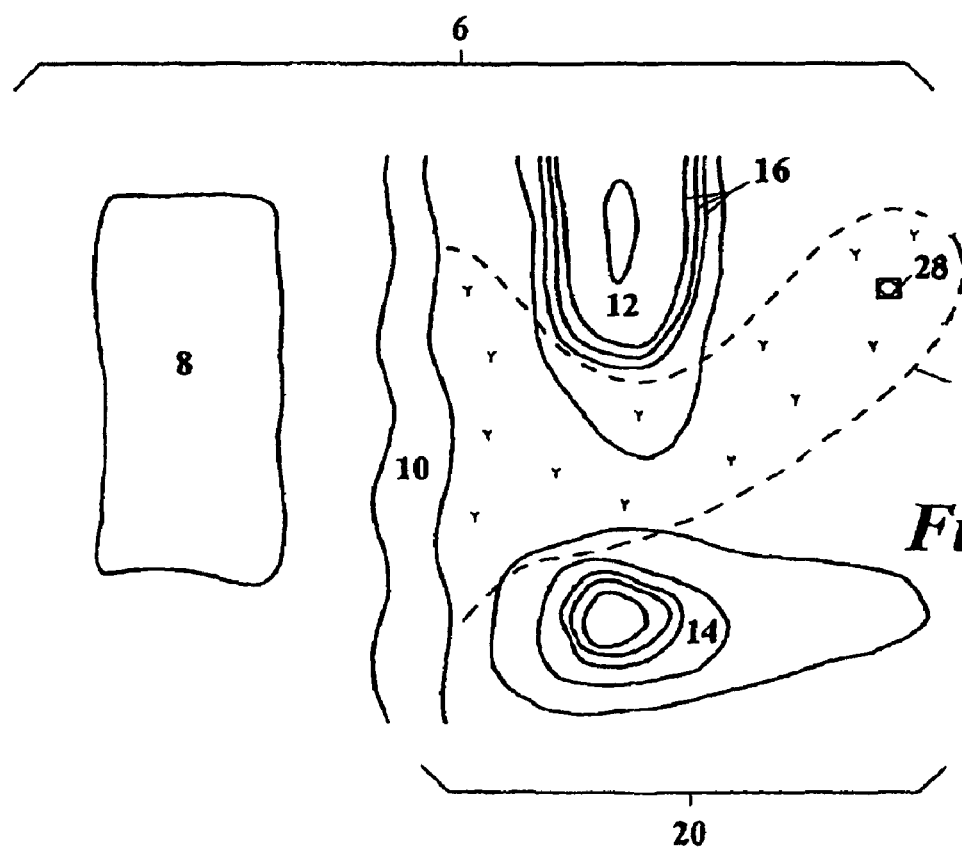
FIG. 3 is a topographic map of the foraging area depicted in FIG. 2, shown during a later preconditioning period.

FIG. 3 is a topographic map of the foraging area 6 depicted in FIG. 2, shown during a later preconditioning period. Specifically, FIG. 3 shows the preconditioned forage area 22 (shown in phantom) created by domestic ungulates Y. The domestic ungulates Y are drawn to an ingestible, which is supplied in at least one deployment location 28 during the preconditioning period.

Figure 4:
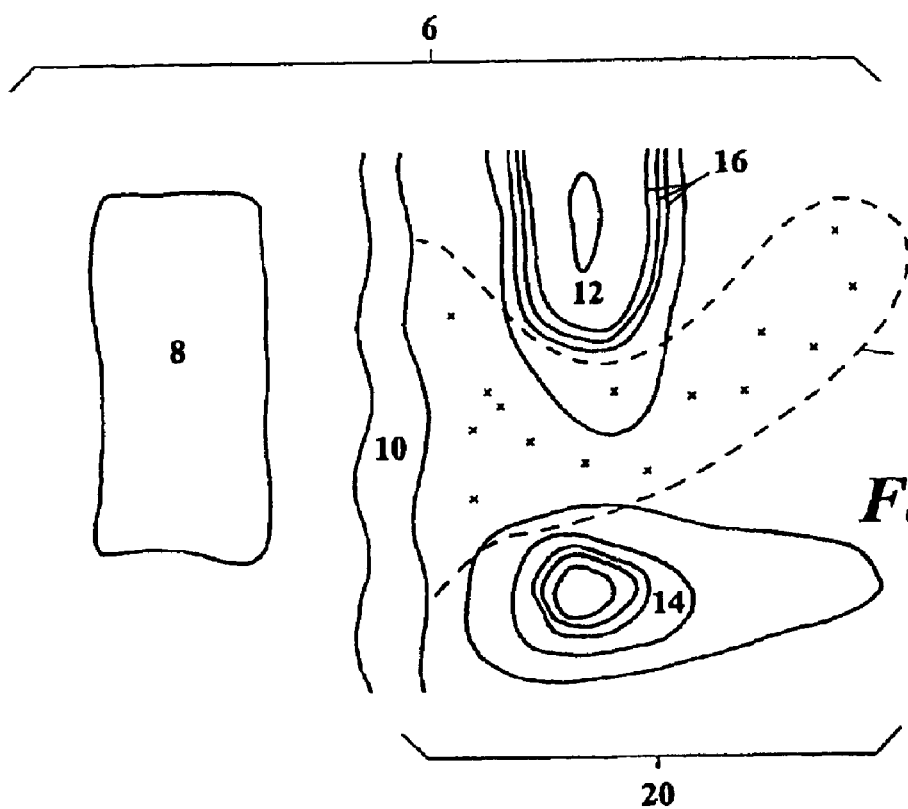
FIG. 4 is a topographical map of the foraging area depicted in FIGS. 2 and 3, shown during a later target period.

FIG. 4 is a topographical map of the foraging area 6 depicted in FIGS. 2 and 3, shown during a later target period. Specifically, FIG. 4 shows the modified WUF distribution 2 (shown in phantom) that results from preconditioning of the foraging area 6.

As illustrated in FIG. 2, the foraging area 6 includes a cultivated field 8, a stream 10, steep hills 12, 14, and a non-field area 20 that has undergone little, if any, grazing by domestic ungulates Y during the previous season. The location and grade of the hills 12, 14 are indicated by contour lines 16. The foraging area 6 may be prairie, foothills, mountains, forest, desert, etc., or any combination of these types of foraging environments.

Since FIG. 2 depicts springtime conditions, the field 8 has young, tender sprouting plants and the non-field area 20 has old cured forage from the previous season. As can be understood by those skilled in the art, wild ungulates X typically prefer grazing young, tender sprouting forage over grazing old, cured forage. Thus, as indicated in FIG. 2, the natural WUF distribution 2 encompasses the field 8 and the areas immediately adjacent to the stream 10 and excludes the non-field area 20. Thus, the field 8 is under substantial WUF pressure.

A foraging area manager, such as a farmer, rancher or public land manager, determines that the natural WUF distribution 2 should be shifted via preconditioning of a targeted foraging area 22 so WUF pressure on the field 8 is reduced the following spring. Thus, the target period during which the wild ungulates X will use the targeted (i.e., preconditioned) foraging area becomes the following spring (block 105 of FIG. 1).

As indicated in FIG. 3, the foraging area manager inspects the foraging area 6 to select a deployment location 28 that will facilitate the creation of a targeted (i.e., preconditioned) foraging area 22 (shown in phantom) that will adequately shift the WUF distribution 2 the following spring (block 100 of FIG. 1). The targeted foraging area 22 will be more effective in shifting the WUF distribution 2 away from the field 8 when consideration is given to the relationship between the deployment location 28 and the foraging area's topography and water supply locations. For example, as shown in FIG. 3, the deployment location 28 is separated from the stream 10 by hills 12, 14 and significant distance. Thus, during the precondition period, as domesticated ungulates Y forage between the stream 10 and the deployment location 28, they will create a preconditioned foraging area 22 that is large and roughly bounded by the hills 12, 14 and the stream 10. As shown in FIG. 3, the preconditioned foraging area 22 also has the advantage of being on the opposite side of the stream 10 from the field 8. Thus, during the target period, wild ungulates X can forage the preconditioned foraging area 22 and access the stream 8 without having to travel near the field 8.

Still referring to FIG. 3, the foraging area manager determines the proper preconditioning period for the agriculture operation is fall (block 110 of FIG. 1) because the field 8 will be free of its crop, and the forage in the non-field area 20 will be cured. Thus, the domestic ungulates Y, when preconditioning the targeted foraging area 22, will be able to remove the old, cured forage without harming any crops in the field 8.

As illustrated in FIG. 3, during the preconditioning period, an ingestible is supplied in one or more deployment locations 28 within the targeted foraging area 22 to which the domesticated ungulates Y are to be located (block 115 of FIG. 1). The domesticated ungulates Y then forage (i.e., precondition) the targeted foraging area 22 (block 120 of FIG. 1) to remove the old, cured forage. For the purpose of this specification, an ingestible is any substance meant to be ingested by domestic ungulates Y. For example, an ingestible could be water, livestock cake, beet pulp, silage, hay, straw, grain, chemically hardened blocks, protein blocks, pressed blocks, liquid or granular feed supplements, mineral blocks, granular mineral supplements, salt blocks, granular salt supplements, or a highly-palatable, portable, self-limiting, animal feed supplement of the type described later in this specification. The ingestible will attract the domestic ungulates Y to the one or more deployment locations 28. The ingestible will also increase the presence (i.e., dwell time) of the domestic ungulates Y within the targeted foraging area 22. As a result, the domestic ungulates may consume all, or most of, the old, cured forage. Additionally, during the preconditioning period, the domestic ungulates deposit manure to facilitate the next growing season.

As shown in FIG. 4, when the target period has arrived, which in this example is the spring following the fall preconditioning period, the WUF distribution 2 shifts away from the field 8 to encompass the targeted (i.e., preconditioned) foraging area 22 (block 130 of FIG. 1). This is because the preconditioned foraging area 22 has young, tender sprouting plants, the old, cured forage having been removed by the domestic ungulates Y during the fall preconditioning period. The WUF distribution shifts from the field to the targeted foraging area 22 because of the wild ungulates' preference for preconditioned forage.

Wild ungulates' preference for forage that has been preconditioned by domestic ungulates Y is supported by a study entitled, Influence of Cattle Grazing On Elk Forage Conditions and Habitat Selection, K. K. Crane, et al., Proceedings, Western Section, American Society of Animal Science, Vol. 52 (2001), which is hereby incorporated by reference in its entirety. The study results indicate that elk (i.e., wild ungulates X) avoided areas where cattle (i.e., domestic ungulates Y) had not grazed during the preceding summer. The study results also indicated that elk preferred to forage in the winter and fall where cattle had lightly or moderately grazed the preceding summer. Finally, the study results indicated that elk strongly preferred to forage in the spring where cattle had grazed moderately during the preceding summer.

Figure 5:
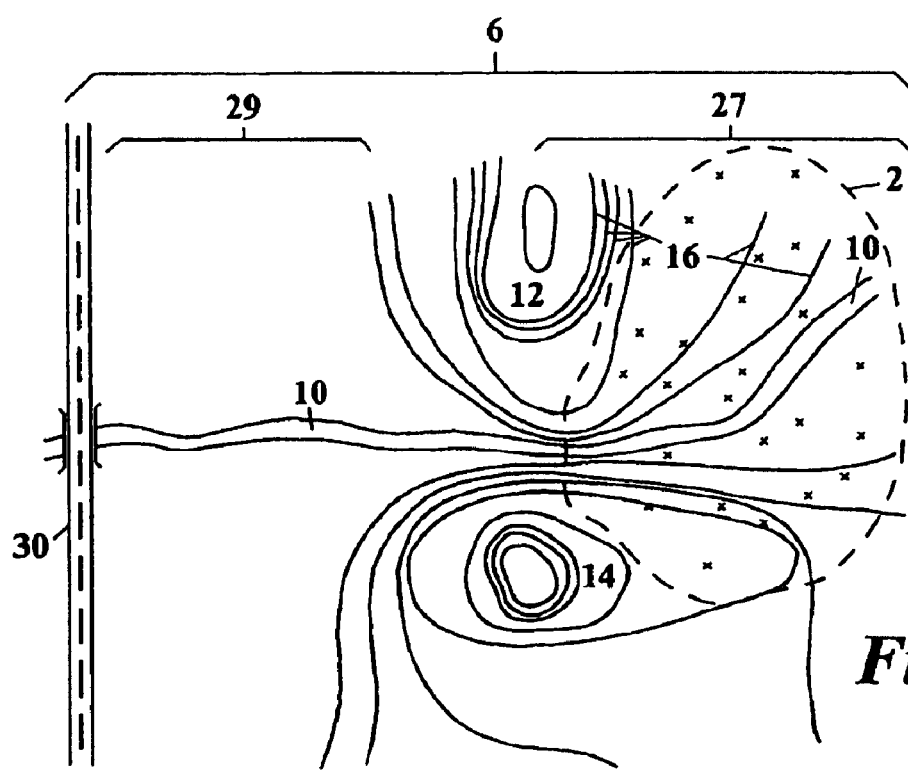
FIG. 5 is a topographic map showing the unmodified natural wild ungulate foraging distribution in a foraging area.

The method, in another embodiment, will now be explained by referring to a series of topographical maps (FIGS. 5, 6 and 7) that illustrate how the WUF distribution 2 is shifted away from a remote high elevation foraging area 27 to a low elevation foraging area 29 near a road 30. FIG. 5 is a topographic map showing the unmodified natural WUF distribution 2 (shown in phantom) in a foraging area 6.

Figure 6:
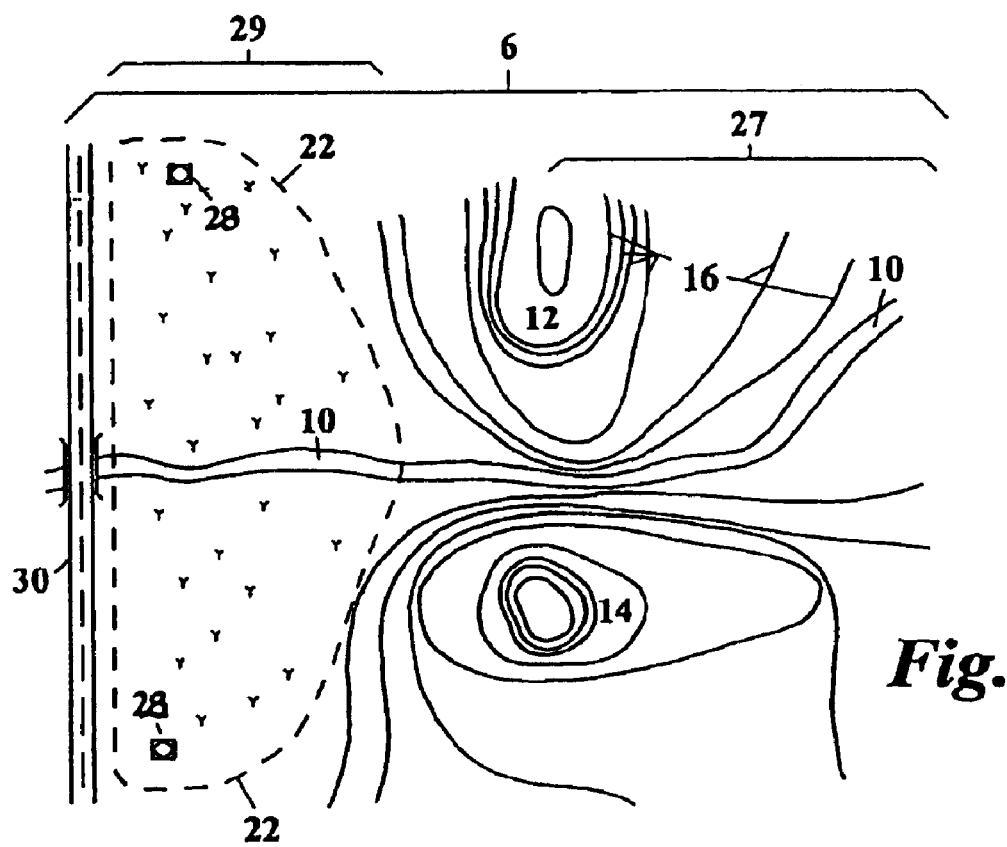
FIG. 6 is a topographic map of the foraging area depicted in FIG. 5, shown during a later preconditioning period.

FIG. 6 is a topographic map of the foraging area 6 depicted in FIG. 5, shown during a later preconditioning period. Specifically, FIG. 6 shows the preconditioned forage area 22 (shown in phantom) created by domestic ungulates Y. The domestic ungulates Y are drawn to an ingestible, which is supplied in at least one deployment location 28 during the preconditioning period.

Figure 7:
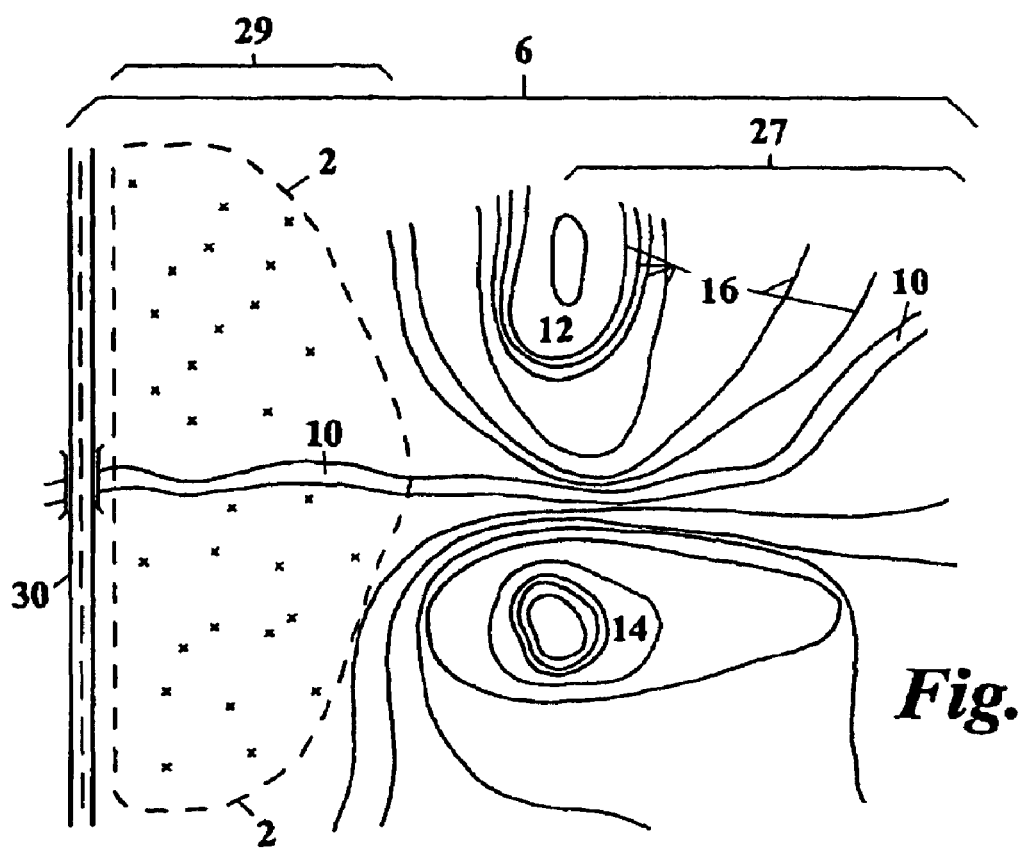
FIG. 7 is a topographical map of the foraging area depicted in FIGS. 5 and 6, shown during a later target period.

FIG. 7 is a topographical map of the foraging area 6 depicted in FIGS. 5 and 6, shown during a later target period. Specifically, FIG. 7 shows the modified WUF distribution 2 (shown in phantom) that results from preconditioning of the foraging area 6.

As illustrated in FIG. 5, the foraging area 6 includes a stream 10, steep hills 12, 14, and a road 30. The low elevation foraging area 29 near the road 30 has undergone little, if any, grazing by domestic ungulates Y during the previous season. The location and grade of the hills 12, 14 are indicated by contour lines 16. The foraging area 6 may be prairie, foothills, mountains, forest, desert, etc., or any combination of these types of foraging environments.

FIG. 5 depicts conditions when the wild ungulates X are foraging in the remote high elevation foraging area 27 and avoiding foraging in the low elevation foraging area 29 near the road 30. As can be understood by those skilled in the art, wild ungulates X typically migrate to foraging areas that are remote from the pressures of human civilization. Thus, as indicated in FIG. 5, the natural WUF distribution 2 encompasses the remote high elevation foraging area 27 and excludes the low elevation foraging area 29 near the road 30. This natural WUF distribution 2 can arise at different times of the year for different reasons. For example, pressure from hunters will cause the natural WUF distribution 2 to shift to the remote high elevation foraging area 27 in the fall. Similarly, in national parks, hot weather and pressure from tourists will cause the natural WUF distribution 2 to shift to the remote high elevation foraging area 27 in the summer. A foraging area manager, such as a public land manager, determines that the natural WUF distribution 2 should be shifted via preconditioning of a targeted foraging area 22 to increase the presence of the wild ungulates X in the low elevation foraging area 29 near the road 30. If the land manager is trying to increase the presence of the wild ungulates X in the low elevation foraging area 29 to allow tourists the opportunity to see wild ungulates X during the summer months, then the target period during which the wild ungulates X will use the targeted (i.e., preconditioned) foraging area 22 becomes the summer (block 105 of FIG. 1). If the land manager is trying to increase the presence of rutting elk or deer (i.e., wild ungulates X) in the low elevation foraging area 29 to allow photographers increased opportunity to photograph the elk or deer during the fall rut, then the target period during which the rutting elk or deer (i.e., wild ungulates X) will use the targeted (i.e., preconditioned) foraging area 22 becomes the fall (block 105 of FIG. 1).

As indicated in FIG. 6, the foraging area manager inspects the foraging area 6 to select deployment locations 28 that will facilitate the creation of a targeted (i.e., preconditioned) foraging area 22 (shown in phantom) that will adequately shift the WUF distribution 2 from the remote high elevation foraging area 27 to the low elevation foraging area 29 (block 100 of FIG. 1). The targeted foraging area 22 will be more effective in shifting the WUF distribution 2 when consideration is given to the relationship between the deployment locations 28 and the foraging area's topography and water supply locations. For example, as shown in FIG. 5, each deployment location 28 is near the road 30 and is approximately equal in distance from the stream 10. Thus, during the precondition period, as domesticated ungulates Y forage between the stream 10 and the deployment locations 28, they will create a preconditioned foraging area 22 that is large and bounded by the hills 12, 14 and the road 30.

Still referring to FIG. 6, the foraging area manager determines the proper preconditioning period for the tourist scenario is fall (block 110 of FIG. 1) because tourists will not be present, wild ungulates X will not be giving birth in the low elevation foraging area 29 as they may in the spring, and forage in the low elevation foraging area 29 will be cured. Thus, the domestic ungulates Y, when preconditioning the targeted foraging area 22, will be able to remove the old cured forage with the least amount of adverse impact possible. In the wildlife photography scenario, the foraging manager determines the proper preconditioning period is summer (block 110 of FIG. 1) because wild ungulates X will not be giving birth in the low elevation foraging area 29, and the forage in the low elevation foraging area 29 will be cured. The removal of old cured forage prior to fall and the reception of early fall moisture can result in new, fresh forage growth in the fall, which the wild ungulates X find enticing.

As illustrated in FIG. 6, during the preconditioning period, an ingestible is supplied in one or more deployment locations 28 within the targeted foraging area 22 wherein the domesticated ungulates Y are then located (block 115 of FIG. 1). The domesticated ungulates Y then forage (i.e., precondition) the targeted foraging area 22 (block 120 of FIG. 1) to remove the old, cured forage. As previously stated, for the purposes of this specification, an ingestible is any substance meant to be ingested by domestic ungulates Y, that will attract the domestic ungulates Y to the one or more deployment locations 28, and that will also increase the presence (i.e., dwell time) of the domestic ungulates Y within the targeted foraging area 22.

As shown in FIG. 7, when the target period has arrived, which in the tourist scenario is the summer following the fall preconditioning period and in the wildlife photography scenario is the fall following the summer preconditioning period, the WUF distribution 2 has shifted away from the remote high elevation foraging area 27 to encompass the targeted (i.e., preconditioned) foraging area 22 (block 130 of FIG. 1). This is because the preconditioned foraging area 22 has young, tender sprouting plants, the old cured forage having been removed by the domestic ungulates Y during the preconditioning period. The WUF distribution 2 shifts from the remote high elevation foraging area 27 to the targeted foraging area 22 because of the wild ungulates' preference for preconditioned forage.

It should be understood that the two preceding scenarios have been presented as examples to illustrate the subject invention. The two preceding examples are not intended to be limiting.

As can be understood from the preceding examples, the subject invention can be employed to utilize domestic ungulates to precondition any type of foraging area, regardless of the foraging area's vegetative composition, water supplies, topographical features, elevation, or location. Thus, the foraging area to be preconditioned by domestic ungulates for later wild ungulate use will depend on the circumstances facing the range manager, the goals the range manager desires, and where the range manager would like the WUF distribution 2 to be shifted during the target period.

As can be understood from the preceding examples, the preconditioning period can occur during any season or month of the year or condition of the foraging area. Also, the preconditioning period can be of any duration. The preconditioning period's timing and duration will depend on the circumstances facing the range manager, the goals the range manager desires to achieve, and when the target period is to occur.

As can be understood from the preceding examples, the target period can occur during any season or month of the year or condition of the foraging area. Also, the target period can be of any duration. The target period's timing will depend on the circumstances facing the range manager, the goals the range manager desires to achieve, and when the preconditioning period occurred.

With most embodiments of the invention, the target period will occur within 12 months subsequent to the preconditioning period. For example, in one embodiment, the target period will occur during or immediately after the growth period following the preconditioning period. However, due to drought conditions, during the 12 months subsequent to the preconditioning period, a growth period may not sufficiently occur to allow the target period. Consequently, in the case of prolonged drought conditions, the target period may have to wait 24, 36 or more months after the precondition period for an adequate growth period to occur. Therefore, in one embodiment of the invention, the target period can be said to occur any time after the preconditioning period.

In one embodiment, the preconditioning period occurs any time within approximately summer and the target period occurs any time within approximately the following spring. In one embodiment, a second preconditioning period occurs any time within approximately fall.

In one embodiment suitable for the Northern hemisphere, the preconditioning period occurs any time within the time span running from approximately June 1 through approximately August 31 and the target period occurs any time within the following time span running from approximately April 1 through approximately June 30. In one embodiment, a second preconditioning period occurs any time within the time span running from approximately September 1 through approximately November 30. In one embodiment, the preconditioning period occurs during a time span within approximately June 1 through August 31 of a first year and the target period occurs during a time span within approximately April 1 through June 30 of a second, successive year. In one embodiment, the preconditioning period occurs any time within approximately summer and the target period occurs any time after the preconditioning period. In one embodiment, the preconditioning period occurs any time within the time span running from approximately June 1 through approximately August 31 and the target period occurs any time after the preconditioning period. In one embodiment, the preconditioning period occurs any time within approximately fall and the target period occurs any time after the preconditioning period. In one embodiment, the preconditioning period occurs any time after the forage in the foraging area has essentially cured and the target period occurs subsequent to the preconditioning period when the forage in the foraging area is essentially green.

Based on the preceding disclosure, those skilled in the art will be able to select time periods for the preconditioning and targeting periods that are appropriate for an embodiment suitable for the Southern hemisphere. Therefore, those time periods that are appropriate for an embodiment suitable for the Southern hemisphere should be considered to be part of this disclosure, and the invention and disclosure should be considered to include both Northern and Southern hemisphere embodiments.

As can be understood by those skilled in the art, the subject invention allows individuals and groups, such as ranchers, farmers, wildlife enthusiasts, environmentalists, state and national wildlife agencies, and state and national land management agencies, to passively manage (i.e., without fencing or herding) where wild ungulates X forage. Thus, the subject invention is advantageous because it allows individuals and groups to passively manage where wild ungulates X reside within a foraging area 6.

The subject invention is more effective when the ingestible is only deployed in a few locations within the targeted foraging area 22 and periodically rotated from one deployment location 28 to another deployment location 28. For example, in one embodiment of the invention, a person may move the ingestible from a first deployment location 28 within a targeted foraging area 22 to a second deployment location 28 within the same or different targeted foraging area 22 when the forage in the area surrounding the first deployment location 28 has been lightly grazed. In another embodiment, a person may move the ingestible from a first deployment location 28 within a targeted foraging area 22 to a second deployment location 28 within the same or different targeted foraging area 22 when the forage in the area surrounding the first deployment location 28 has been moderately grazed. In another embodiment, a person may move the ingestible from a first deployment location 28 within a targeted foraging area 22 to a second deployment location 28 within the same or different targeted foraging area 22 when the forage in the area surrounding the first deployment location 28 has been heavily grazed. In yet another embodiment, a person may move the ingestible from a first deployment location 28 within a targeted foraging area 22 to a second deployment location 28 within the same or different targeted foraging area 22 when the ingestible supply in the first deployment location 28 has been depleted.

For the purpose of this specification, in one embodiment of the invention, lightly grazed is approximately less than 25 percent utilization of the available forage, moderately grazed is approximately 25 percent to approximately 75 percent utilization of the available forage, and heavily grazed is approximately greater than 75 percent utilization of the available forage. In one embodiment, the extent of the utilization is based on multiple representative transects for stubble height collections that are 100 yards or meters in length. In one embodiment, the extent of the utilization is determined by converting plant height to percent utilization with height-weight forage curves as are known in the art. In one embodiment, plant heights are collected along utilization transects near the deployment location 28 prior to placement of the ingestible and then again after the ingestible has been deployed for a predetermined period, such as five days, seven days, 10 days, etc.

In another embodiment, the extent of the utilization is based on the observations and judgment of one skilled in the art, such as an experienced rancher, range scientist, government land manager, environmentalist, etc. In other words, one skilled in the art would view the first deployment location 28 and would determine, based on his experience and judgment, that the forage in the area surrounding the first deployment location 28 has been sufficiently grazed to warrant moving the ingestible from the first deployment location 28 to the second deployment location 28.

Relocating the ingestible from deployment location 28 to deployment location 28 within a targeted foraging area 22 and/or from targeted foraging area 22 to targeted foraging area 22, prevents the domestic ungulates Y from locally overgrazing the forage near a deployment location 28 and results in a more evenly preconditioned targeted foraging area 22. Also, relocating the ingestible lowers the initial capital cost because the person providing the ingestible does not need to stock as many deployment locations 28. Preconditioning of the targeted foraging area 22 can also be more effective when the ingestible is provided in a deployment location 28 from which the domesticated ungulates Y can periodically travel to a source of water 10.

If a person chooses to provide the ingestible in several deployment locations 28, the deployment locations 28 should be in equivalent positions. Equivalence occurs in areas where the domesticated ungulates Y use the ingestible at an approximately equal rate.

Equivalent positions can be identified by monitoring the amount of ingestible consumed at a particular deployment location 28 and moving its position accordingly. For example, where the ingestible is provided in a container, a rancher can periodically measure the distance between the top of the container and the top surface of the ingestible to track the rate at which the ingestible is being consumed at each deployment location 28. In one embodiment, the interior side of the container may have graduated measurement lines that are exposed as the ingestible supply decreases within the container. The rancher can then track the rate at which the ingestible is consumed by periodically reading the graduated measurement lines.

In one embodiment, the ingestible used in this invention is an animal feed supplement made from a highly palatable, consumption limited material. Palatability refers to the extent that the domesticated ungulates Y desire the product and is related to the product's taste and nutrition content. Highly palatable supplements are preferred, because they encourage domesticated ungulates Y to travel greater distances to consume the product.

Consumption limits prevent domesticated ungulates Y from satisfying their craving for the product in one feeding session. Consumption limits can be imposed by choosing a supplement material that cannot be consumed rapidly (i.e., a "self-limiting supplement") or by using a mechanical apparatus to limit the supplement's availability. Consumption limited supplements are desirable, because they encourage the domesticated ungulates Y to spend more time around the deployment location 28 and, as a result, in the targeted foraging area 22.

The combination of highly palatability and limited consumption is particularly desirable for the present application, because it causes the domesticated ungulates Y to travel significant distances to the supplement, to remain in the targeted foraging area 22, and to consume the local forage between their repeated limited consumption of the supplement. A suitable supplement could be a molasses product that is dehydrated to reduce the moisture content and fortified with vitamins, minerals, and other protein sources. Other suitable supplements include, but are not limited to a liquid supplement in a consumption-limiting container, a chemically hardened block, or a pressed block.

It is also desirable that the supplement contains those specific proteins, fat, vitamins, macro minerals, and trace minerals that the domesticated ungulates Y require for proper nutrition. Studies have shown that the protein content of the forage limits the animal's weight gain because low protein levels reduce consumption and suppress microbial fermentation in the animal's digestive system. Nutrition supplements have also been shown to improve the overall body condition and the reproductive performance of the domesticated ungulates Y.

The preferred embodiment of the supplement used with this invention is based on a solid feed supplement sold under the trade name CRYSTALYX® BGF-30 by Hubbard Feeds, Inc., P.O. Box 8500, 424 North Riverfront Drive, Mankato, Minn. 56001. CRYSTALYX® BGF-30 is a molasses-based supplement block manufactured to be fed to cattle free choice. It contains molasses products, hydrolyzed feather meal, plant protein products, hydrolyzed vegetable oil, processed grain by-products, urea, monocalcium phosphate, dicalcium phosphate, calcium carbonate, magnesium oxide, manganese sulfate, zinc sulfate, copper sulfate, copper chloride, ethylenediamine dihydriodide, calcium iodate, cobalt carbonate, sodium selenite, vitamin A acetate, vitamin D3 supplement, vitamin E supplement. These ingredients are dehydrated to reduce the moisture content and result in the following nutrient analysis:

| CRYSTALYX ® BGF-30 NUTRIENT ANALYSIS: | |
| --- | --- |
| Crude Protein, min | 30.0% (Including not more than 12.0% equivalent crude protein as non-protein nitrogen.) |
| Crude Fat, min | 4.0% |
| Crude Fiber, max | 2.5% |
| Calcium (Ca), min | 2.0% |
| Calcium (Ca), max | 2.5% |
| Phosphorus (P), min | 2.0% |
| Potassium (K), min | 2.5% |
| Magnesium (Mg), min | 0.5% |
| Cobalt (Co), min | 3.3 ppm |
| Copper (Cu), min | 330 ppm |
| Iodine (I), min | 17 ppm |
| Manganese (Mn), min | 1,330 ppm |
| Selenium (Se), min | 4.4 ppm |
| Zinc (Zn), min | 1,000 ppm |
| Vitamin A, min | 80,000 IU/lb |
| Vitamin D, min | 8,000 IU/lb |
| Vitamin E, min | 30 IU/lb |
| Salt (NaCl) | none added |

CRYSTALYX® BGF-30 has a number of beneficial properties. For example, CRYSTALYX® BGF-30 is weatherproof so that a user, such as a rancher, can leave this supplement block in the targeted foraging area 22 without losses to wind or rain. Furthermore, the CRYSTALYX® BGF-30 block only has 2% to 6% moisture content. This is desirable because it reduces the transportation cost necessary to use the invention in remote and rugged areas. Finally, CRYSTALYX® BGF-30 improves the livestock's digestion by providing a good growth medium in the animal's rumen for the bacteria that break down vegetable material.

Other animal feed supplement formulas are within the scope of this invention, several of which are well known in the art. These supplements generally contain the following nutritional content:

| NUTRIENT ANALYSIS | MINIMUM | MAXIMUM |
| --- | --- | --- |
| Crude Protein | 4.0% | 65.0% |
| Crude Fat | 2.0% | 12.0% |
| Crude Fiber | 0.5% | 4.0% |
| Calcium (Ca) | 0.4% | 10.0% |
| Phosphorus (P) | 0% | 10.0% |
| Salt (NaCl) | 0% | 10.0% |
| Potassium (K) | 0.5% | 6.0% |
| Magnesium (Mg) | 0.15% | 6.0% |
| Cobalt (Co) | 1.0 ppm | 15 ppm |
| Copper (Cu) | 15 ppm | 1,000 ppm |
| Iodine (I) | 2.0 ppm | 100 ppm |
| Manganese (Mn) | 25 ppm | 3,000 ppm |
| Selenium (Se) | 0 ppm | 30 ppm |
| Zinc (Zn) | 25 ppm | 3,400 ppm |
| Vitamin A | 0 IU/lb | 200,000 IU/lb |
| Vitamin D | 0 IU/lb | 40,000 IU/lb |
| Vitamin E | 0 IU/lb | 1,000 IU/lb |
| Non-protein Nitrogen | 0% | 52% |

The actual nutrient content depends on whether the supplement is designed to have high protein, low protein, and/or trace mineral fortification.

In one embodiment of the invention, the animal feed supplement is provided in the targeted foraging area 22 at a weekly rate of approximately 0.7 to approximately 10.5 pounds of supplement per bovine animal unit. In one embodiment, the animal feed supplement is a liquid provided in the targeted foraging area 22 at a weekly rate of approximately 10.5 to approximately 35 pounds of supplement per bovine animal unit.

In one embodiment, the animal feed supplement is a liquid provided in the targeted foraging area 22 at a weekly rate of approximately 5.2 to approximately 17.5 pounds of dry matter supplement per bovine animal unit. In one embodiment, the animal feed supplement is a pressed or chemically hardened block provided in the targeted foraging area 22 at a weekly rate of approximately 1.4 to approximately 31 pounds of dry matter supplement per bovine animal unit. It should be noted that the aforementioned "dry matter" rates are the equivalents of what the rates would be if substantially all of the moisture were removed from a supplement supplied in liquid, pressed block or chemically hardened form.

Figure 8:
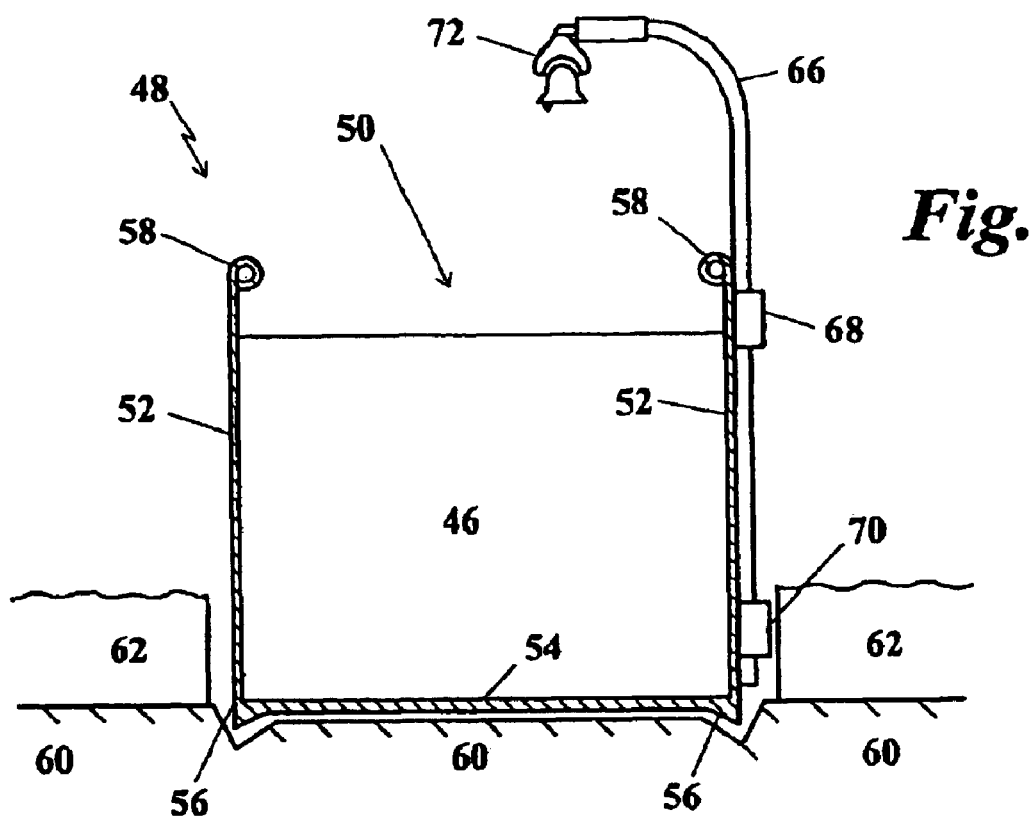
FIG. 8 is a sectional view of a supplement container.

The animal feed supplement 46 used in this invention should be provided in a container 48 such as that shown in FIG. 8. This container 48 is generally configured into a barrel shape having an open top 50, a sidewall 52, a bottom 54, a protruding bottom lip 56, and a top edge 58. The open top 50 should be large enough to allow easy access to the supplement 46 and the bottom 54 should be wide enough to prevent domesticated ungulates Y (e.g., livestock) from tipping the container 48. The top edge 58 is preferably formed into a shape that prevents livestock Y from injuring themselves when consuming the supplement 46.

The weight of the container 48 and of the supplement 46 drives the protruding lip 56 into the ground 60. This feature makes the container 48 particularly desirable for use on steeply sloped hillsides because it deters sliding motion caused by livestock Y or by gravity in snow, ice, mud or other slippery conditions. Making the supplement 46 essentially immovable by livestock Y even when the container 48 is almost empty helps insure that the livestock-attracting focus remains in the same deployment location 28. However, the size and weight should be consistent with the need to deliver the filled containers 48 to somewhat remote terrain.

The preferred embodiment uses a steel half-barrel that is offered in sizes up to approximately 250 pounds of supplement 46. One advantage of this embodiment is that the steel construction prevents livestock Y from biting or trampling the supplement 46. This enhances the self-limiting feature of the preferred supplement formula. Another advantage of the preferred embodiment is its ability to be recycled. Despite these advantages, however, other embodiments are possible. For example, the container 48 could be made from plastic, cardboard, or aluminum instead of steel and the rounded top edge 58 could be replaced by a plastic protector. Other container sizes, shapes, and materials consistent with the above objectives are also within the scope of this invention.

The effectiveness of this invention increases if the domesticated ungulates Y (e.g., livestock) develop an association between the supplement 46 and an identifier associated with the supplement 46. Although a wide variety of features can function as an identifier, an effective identifier should be capable of signaling the location of the supplement 46 to the livestock Y over a significant distance. This association need only be trained into a portion of the herd. The rest of the animals will naturally develop the association, because livestock Y are naturally drawn towards other livestock Y. That is, the existence of a crowd of livestock Y will draw additional livestock Y to that location.

One possible identifier is the color of the supplement container 48. Although this color can be any shade that domesticated ungulates Y (e.g., livestock) can perceive, it is desirable that the color contrasts with the container's surroundings throughout the year. Black and/or blue containers 48 appear to be easily perceived both in snow and in rangeland having light brown color tones. The dark colors, like black and blue, are also desirable because they absorb solar energy. This causes the container 48 to melt into any underlying snow or ice 62 and helps the container 48 remain where the rancher placed it.

Another possible identifier is the odor of the supplement 46. Although this odor can be any scent that domesticated ungulates Y (e.g., livestock) can perceive, it is desirable that the odor be relatively unusual. This will prevent the domesticated ungulates Y from confusing the identifier odor with naturally occurring scents. One embodiment of this invention uses onion by-products to produce an onion odor identifier.

A third possible identifier is a sound. Like color or odor identifiers, sonic identifiers can be anything perceivable by domesticated ungulates Y (e.g., livestock). However, it is desirable that the identifying noise be easily distinguishable from naturally occurring sounds. In one embodiment of this invention, a flexible pole 66 is attached to the container 48 by upper and lower supports 68, 70. A bell 72 is attached to the flexible pole 66 opposite the supports 68, 70. Livestock Y hit the pole 66 while feeding on the supplement 46 and cause the bell 72 to ring. This sound alerts other livestock Y to the supplement's location and to the presence of other animals. These two factors combine to draw the other livestock Y to the targeted foraging area 22. Other embodiments of this invention replace the bell 72 with a wind-chime. The wind-chime alerts livestock Y to the supplement's location whenever the wind blows.

It will be easier to establish the initial connection between the ungulates Y (e.g., livestock) and the supplement 46 if the identifier is naturally attractive to the livestock Y. That is, a naturally attractive container (color or configuration) or sound may appeal to the curiosity of an animal that has not previously experienced the supplement 46 and draw its presence for a taste. Similarly, a naturally attractive odor may lure the livestock Y to the supplement 46 and cause it to try the product. These initial tastes will establish the desirability of the product. The onion odor used in one embodiment of this invention is one such naturally attractive identifier.

Figure 9:
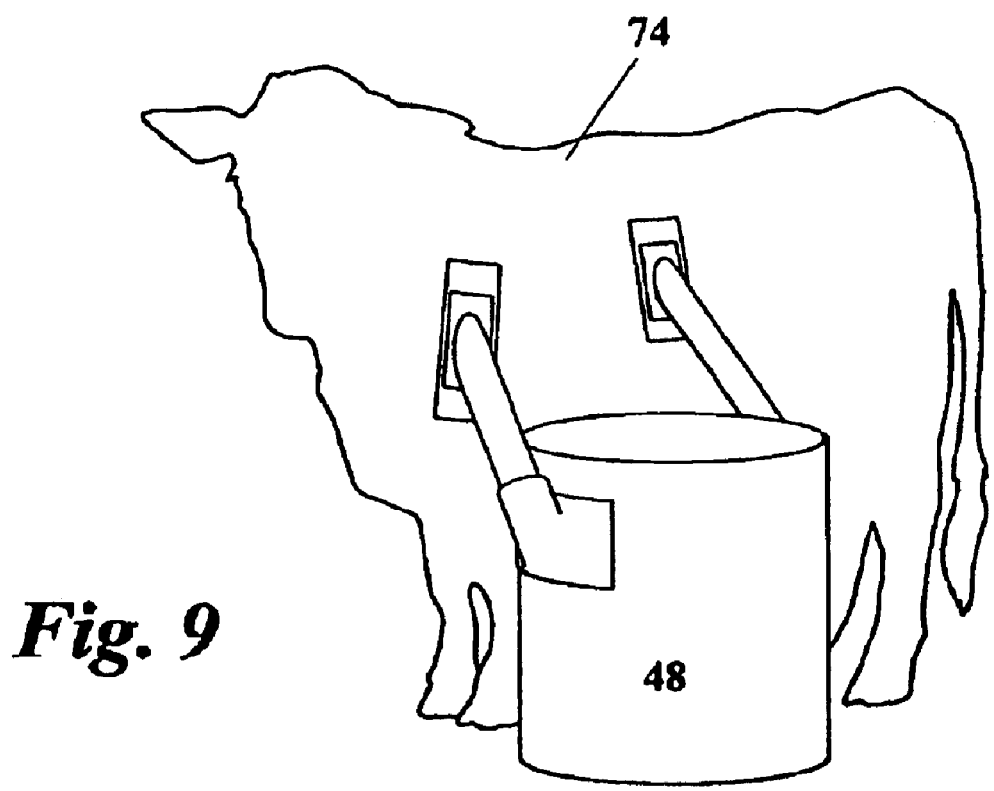
FIG. 9 is a pictorial view of a supplement container attached to an animal silhouette.

The natural instinct of some ungulates Y (e.g., livestock) to congregate can also be used to enhance the effectiveness of this invention. As shown in FIG. 9, a decoy 74 can be attached (preferably, removably attached) to the container 48. The decoy 74 will initially attract livestock Y to the supplement location. This, in turn, will attract additional animals to the targeted foraging area 22. Solar-powered sound sources and/or lights (e.g., blinking LED's) can also be used as attractants and identifiers.

The previously-described embodiments of the subject invention present an effective method of controlling domesticated ungulate foraging distribution to allow the preconditioning of a targeted foraging area 22. Properly controlled preconditioning of a targeted foraging area 22 allows the WUF distribution 2 to be modified, thereby allowing the passive management of wild ungulate foraging and herd location.

The ability of the subject invention to effectively control a domesticated ungulate foraging distribution has been demonstrated in a study conducted by the Montana State University. The study was conducted to determine whether the natural livestock grazing distribution could be improved by strategically placing low moisture, molasses-based supplement blocks 46 in areas within a grazing area that were historically underutilized by livestock Y. Livestock Y, such as cattle Y, naturally avoid areas that are located far from water and/or that require them to climb steep slopes. This tendency causes the cattle to overgraze lowland riparian areas while ignoring abundant or high quality forage in areas far from water or associated with steep slopes.

The research team divided a study area into pastures having easy, moderate, difficult, and inaccessible terrain. The study further divided the pastures having moderate and difficult terrain into control and supplement sites. The research team provided a CRYSTALYX® BGF-30 block in the supplement sites. Every seven to ten days, the research team moved the supplement 46 to new locations.

The study compared the cattle's use of the control and supplement sites by measuring forage utilization and fecal pat abundance before supplementation and after removal. The researchers observed more cattle Y in areas with the supplement 46 ($32\pm8\%$) than in control areas ($3\pm2\%$). They also measured an increase in the number of fecal pats ($3.3\pm7$ pats/$100\,m^2$ vs. $0.5\pm0.5$ pats/$100\,m^2$) and in forage utilization ($17\pm2\%$ vs. $-1\pm1\%$) in areas containing supplement. These results indicate that the natural livestock grazing distribution can be improved by strategically placing low moisture molasses based supplement blocks 46 within a grazing area. For more information about this study, see Bailey & Welling, J. Anim. Sci., Vol. 76, Suppl. 1, p. 191 (1998), which is hereby incorporated by reference in its entirety.

The invention, in one embodiment, uses domesticated ungulates Y, such as cattle, sheep, goats, lamas, horses, etc., to precondition a targeted foraging area 22 for wild ungulates X, such as elk, deer, bison, wild horses, etc. Although the present invention has been described in considerable detail with reference to certain preferred embodiments thereof, variations are possible. For example, in another embodiment, the invention may use wild ungulates X, such as privately owned elk, deer, bison, wild horses, etc., to precondition a targeted foraging area 22 for other wild ungulates X. Also, for example, this invention could be optimized for use with many types of ungulate animals, such as cattle, sheep, goats, lamas, horses, deer, elk, and bison, by switching the animal feed supplement 46 to a formula that appeals to that particular species. Appropriate supplements, such as CRYSTALYX® STABLE-LYX® for horses and CRYSTALYX® SHEEP-LYX® for sheep, are well known in the art. The animal feed supplement described in this invention could also include compounds designed to increase livestock performance, such as ingestible hormones, antibacterial drugs, or stimulants. Therefore, the spirit and scope of the appended claims should not be limited to the description of the preferred versions contained herein.

2. Controlling and/or Eradicating Noxious Plants

As indicated in the flow diagram depicted in FIG. 10 and as will be explained in greater detail later in this specification, in one embodiment, the method of controlling and/or eradicating noxious plant species is as follows. A target area 200 in a foraging area 202 (e.g., pasture, field, etc.) is identified, wherein the target area 200 includes a noxious plant specie 204 (block 300 of FIG. 1). An ungulate specie (domestic and/or wild) Us is selected to interact with the noxious plant specie 204 (block 305 of FIG. 1). A treatment period is selected, wherein the ungulate specie Us interacts with the noxious plant specie 204 in the target area 200 (block 310 of FIG. 1). An ingestible 206 is provided at a first deployment location 208 in the target area 200 (block 315 of FIG. 1). The ingestible 206 is ingestible by the selected ungulate specie Us, attracts the selected ungulate specie Us to the first deployment location 208, and increases the dwell time of the selected ungulate specie Us in the target area 200. The selected ungulate specie Us is introduced to the ingestible 206 located at the first deployment location 208 in the target area 200 (block 320 of FIG. 1).

Figure 11:
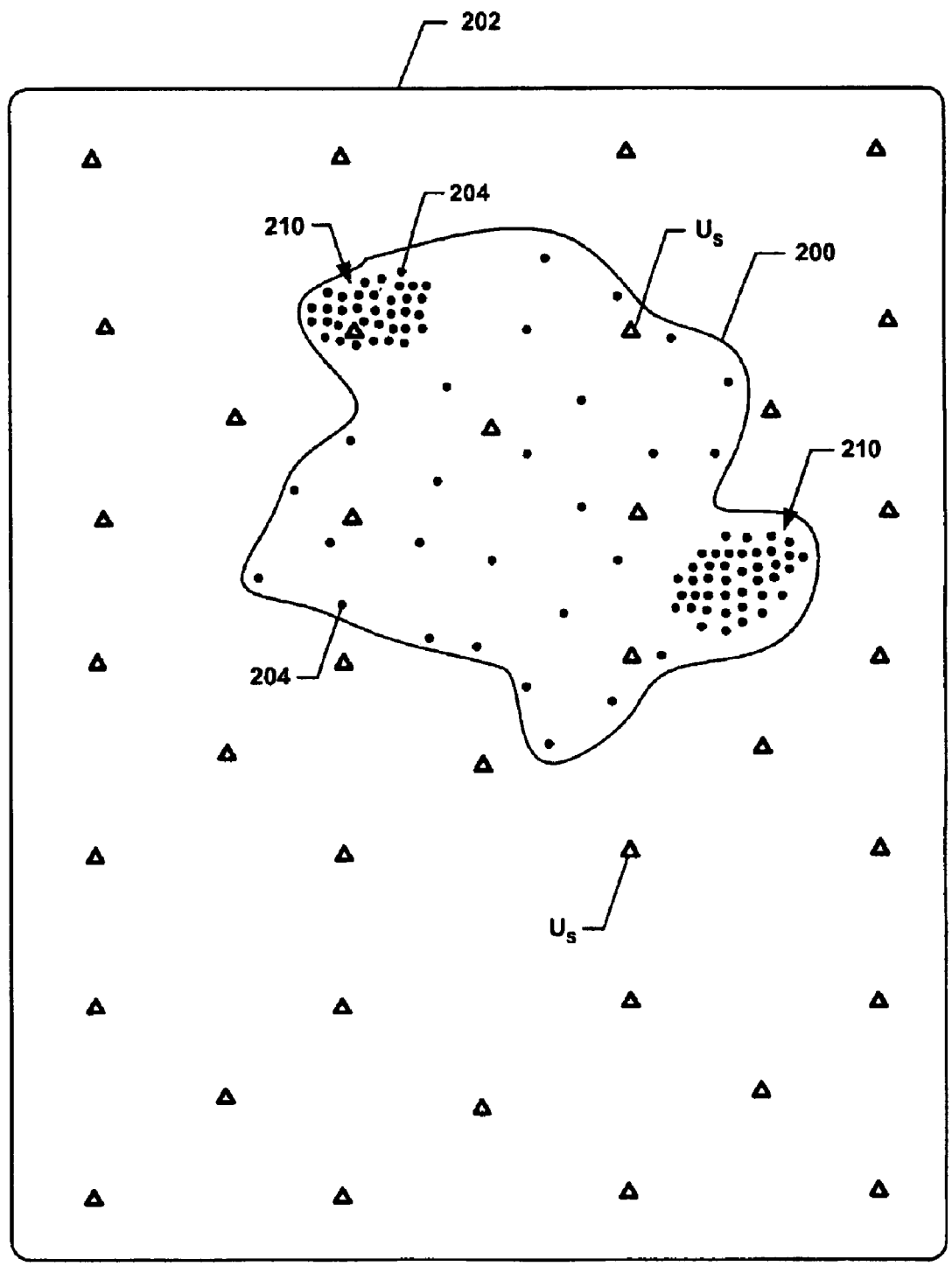
FIG. 11 is a diagrammatic depiction of a hypothetical foraging area illustrating an unmodified ungulate grazing distribution ("UUGD") and wherein the foraging area is idealized in that no topographical features, water source locations, etc. impact the ungulate grazing distribution from being generally uniform throughout the foraging area.
Figure 12:
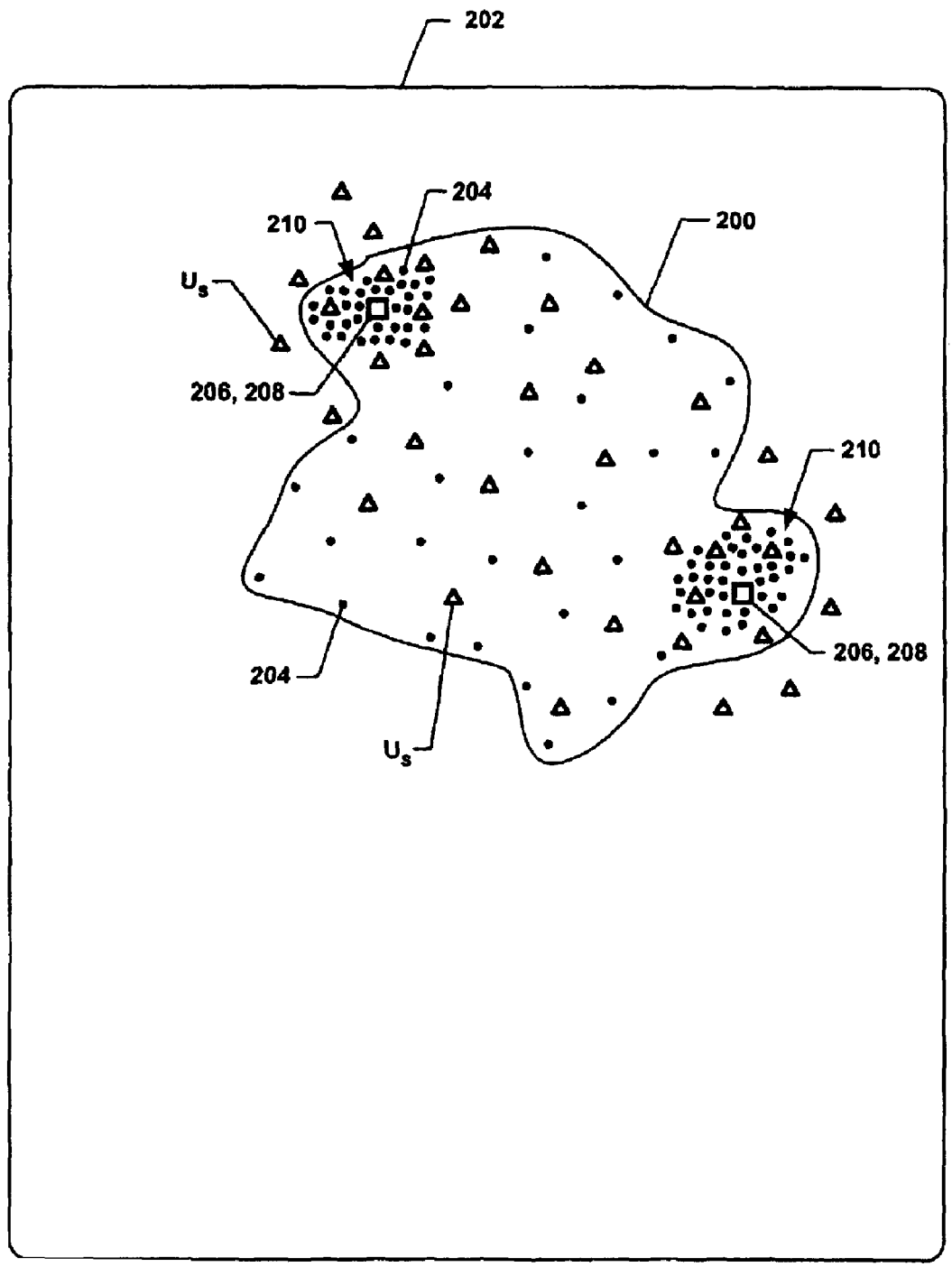
FIG. 12 is a diagrammatic depiction of the same idealized foraging area, except the UUGD has become a modified ungulate grazing distribution ("MUGD") due to the placement of an ingestible in the foraging area.

For a more detailed discussion of the method outlined in FIG. 10, reference is made to FIGS. 11 and 12. FIG. 11 is a diagrammatic depiction of a hypothetical foraging area 202 illustrating an unmodified ungulate grazing distribution ("UUGD") and wherein the foraging area 202 is idealized in that no topographical features, water source locations, etc. impact the ungulate grazing distribution from being generally uniform throughout the foraging area 202. FIG. 12 is a diagrammatic depiction of the same idealized foraging area 202, except the UUGD has become a modified ungulate grazing distribution ("MUGD") due to the placement of an ingestible 206 in the foraging area 202.

As shown in FIG. 11, a limited area 200 of the foraging area 202 is infested with many noxious plants 204. For the this disclosure, noxious plants 204 include native or invasive species plants that are considered to be undesirable in the foraging area 202 for any reason, regardless of whether the plant 204 would be considered beneficial in other foraging areas or under other circumstances. The infested area 200 is termed the target area 200, and the noxious plants 204 infest different areas of the target area 200 to a greater or lesser extent.

For example, as illustrated in FIG. 11, in some areas of the target area 200, the noxious plants 204 are present in a relatively low density (as illustrated in the middle/central portion of the target area 200). In other areas or patches 210, the level of infestation is of a relatively high density as compared to the rest of the target area 200. That is to say, highly dense patches 210 of noxious plants 204 may exist in the target area 200, as shown in FIG. 11.

As illustrated in FIG. 11, the ungulates $U_S$ are relatively evenly disbursed throughout the foraging area 200. Thus, the UUGD is relatively uniform throughout the foraging area 200, and the ungulates provide little means of controlling the propagation of the noxious plants 204.

As shown in FIG. 12, to control, reduce and eventually eradicate the noxious plants 204 in the foraging area 202, an ingestible 206 is provided in one or more deployment locations 208 in the target area 200. Providing the ingestible 206 causes the UUGD to shift to a MUGD, wherein the distribution of ungulates $U_S$ becomes focused about the one or more deployment locations 208 containing the ingestible 206.

The ingestible 206 is placed in the deployment locations 208 after surveying the foraging area 202 for the existence of noxious plants 204 and determining the infestation pattern of the noxious plants 204 in the foraging area 202. The deployment locations 208 may be anywhere in the target area 200 and are located to maximize the impact of the ungulates on the noxious plants 204.

In one embodiment, the ingestible 206 is provided in deployment locations 208 in one or more high density patches 210 in the target area 200. Over time and as deemed necessary to achieve the necessary impact on the noxious plants 204 in the foraging area 202, the ingestible 206 is shifted between various potential deployment locations 208 throughout the target area 200.

Because the distribution of ungulates $U_S$ becomes focused about the one or more deployment locations 208 containing the ingestible 206, the interaction of the ungulates $U_S$ with the foraging area 200 becomes focused in those areas proximate the deployment locations 208. In other words, the grazing and trampling impact of the ungulates $U_S$ is focused on the vegetation proximate the deployment locations 208. Accordingly, the noxious plants 204 proximate the deployment locations 208 become subject to focused grazing and trampling by the ungulates $U_S$. Thus, the noxious plants 204 become subject to the impact of localized overgrazing and trampling, which impedes the propagation of the noxious plant 204.

Once the survey of the foraging area 200 is complete and a target area 200 and deployment locations 208 have been identified, a treatment period and an ungulate specie is selected. The treatment period will be the period in which the selected ungulate specie $U_S$ interacts with the noxious plant 204, and the selected ungulate specie $U_S$ will be the ungulate specie considered to provide the best impact on the noxious plant 204 during the treatment period.

In one embodiment, the selection of the treatment period is coordinated with a stage of the noxious plant specie 204 that offers an increased likelihood the selected ungulate specie $U_S$ will graze on the noxious plant specie 204. For example, some ungulate species will only graze on a specific noxious plant specie during specific growth stages of the noxious plant specie when the noxious plant specie's taste and/or texture are adequately appealing to the ungulate species. Thus, the treatment period is coordinated to coincide with the growth stages offering the appealing taste and/or texture to maximize the impact the selected ungulate specie $U_S$ will have on the propagation of the noxious plant specie 204.

In one embodiment, the selection of the treatment period is coordinated to decrease the likelihood the noxious plant specie 204 will propagate. For example, in one embodiment, the selection of the treatment period is coordinated to precede or otherwise prevent the noxious plant specie 204 going to seed or otherwise reproducing or reaching a reproduction stage. By consistently subjecting the noxious plant specie 204 to focused ungulate grazing and trampling prior to the noxious plant specie 204 reaching a reproduction stage, the noxious plant specie 204 will be reduced and, eventually, eradicated in the target area 200.

It is common for one type of plant specie to have a reproduction stage that occurs at a different time of the year from a reproduction stage of another plant specie. For example, the reproduction stage for a first plant specie might be in the spring and the reproduction for a second plant specie might be in the early or late summer. The plant specie may have several types of reproduction stages, including pollinization/fertilization, seed production, and seed deposition. Depending on the plant specie, grazing and/or trampling that precedes any one or all of these types of reproduction stages will maximize the impact on plant specie's propagation.

In one embodiment, the ingestible 206 is continuously or repeatedly supplied during the treatment period to the deployment locations 208 until the noxious plant specie 204 is eradicated in the target area 200. Relocation of the deployment locations 208 throughout the target area 200 during the treatment period may be required in order to assure adequately intensive grazing and/or trampling of the noxious plant specie 204, depending on the size, shape and density of the noxious plant specie infestation in the target area 200.

In one embodiment, the method will entail multiple treatment periods during a single year. In another embodiment, a single treatment period may extend for the entire year. In one embodiment, the method will be repeated year after year until the noxious plant specie 204 is eradicated from the target area 200.

In an ideal scenario, the timing for the reproduction stage of the noxious plant specie 204 will be different than the timing for the reproduction stage of a plant specie that is desirable for the foraging area. Accordingly, focused grazing and trampling of the noxious plant specie 204 in the target area 200 will reduce the propagation of the noxious plant specie 204 without harming the propagation of the desirable plant specie in the target area 200. Furthermore, because of the increased amount of manure in the target area resulting from the increased dwell time or presence of the selected ungulate specie $U_S$ in the target area 200, conditions in the target area 200 will be optimized to facilitate the desirable plant specie replacing the noxious plant specie 204. This invention makes possible direct succession of species in the target area.

In one embodiment, the selected ungulate specie $U_S$ is a domestic ungulate. Examples of such a domestic ungulate include cattle, sheep, goats, lamas, horses, mules, and donkeys. In one embodiment, the selected ungulate specie $U_S$ is a wild ungulate. Examples of such a wild ungulate include elk, deer, bison, horses, sheep, goats, and antelope. Selection of the ungulate appropriate for the target area will depend on a number of factors, including the ungulate's compatibility with other ungulates scheduled to use the foraging area 202, the ungulate's desire to graze the noxious plant specie 204 during the selected treatment period and the ungulates impact on the propagation of the noxious plant specie 204, the ungulate's susceptibility to predators, the nutritional value of the noxious plant specie 204 to the ungulate, etc.

In one embodiment, the ingestible 206 increases the amount of time the selected ungulate specie $U_S$ spends in close proximity to the deployment location 210. The ingestible 206 is such that the selected ungulate specie Us will, of its own free will, repeatedly return to, and reside near, the deployment location 208. Thus, ingestible 206 passively maintains the selected ungulate specie Us in close proximity to the deployment location 208, which allows focused grazing and trampling of the noxious plant specie 204. Deploying the ingestible 206 avoids the high cost and labor associated with herding the selected ungulate specie Us into the target area 200. Furthermore, the passive nature of enticing the selected ungulate specie Us into the target area 200 via deployment of the ingestible 206 results in greater impact on noxious plant specie propagation as compared to the aggressive nature of herding.

In one embodiment, the ingestible 206 is an animal feed supplement that is highly-palatable, portable, and self-limiting. The animal feed supplement attracts the selected ungulate specie Us to the target area 200 and increases the length of stay, or dwell time, of the selected ungulate specie Us in the target area 200. In one embodiment, the feed supplement 206 is tailored for the nutritional needs of the selected ungulate specie $U_S$ and/or the taste preferences of the selected ungulate specie $U_S$. In one embodiment, the animal feed supplement 206 is any of the CRYSTALYX® products previously discussed in this Detailed Description.

In one embodiment, the ingestible 206 is a chemical block, protein block, pressed block or liquid feed supplement. In one embodiment, the ingestible 206 is water, livestock cake, beet pulp, grain, silage, hay, or straw. In one embodiment, the ingestible 206 is a mineral block, granular mineral supplement, salt block, or granular salt supplement.

3. Reducing Herbaceous Fuels in Areas Susceptible to Wildfires

Wildfires require fuel to ignite, to continue, and to spread. The amount of fuel may play a role in the amount of heat generated by the fire, which in turn relates to its destructive power and ability to spread. With little fuel a wildfire may spread more slowly or not all, or it may not ignite trees or man-made structures in its path, because it does not generate enough heat for a long enough time to ignite all potentially combustible material. The fuels may be classified as: Ground: subterranean roots, duff and other buried organic matter; Crawling or surface: low-lying vegetation such as leaf and timber litter, debris, grass or other grazable plants, and low-lying shrubbery; Ladder: material between low-level vegetation and tree canopies, such as small trees, downed logs, vines, and invasive plants; and Crown, canopy, or aerial: suspended material at the canopy level, such as tall trees, vines, and mosses. The ignition of a crown fire is dependent on the density of the suspended material, canopy height, canopy continuity, and sufficient surface and ladder fires in order to reach the tree crowns.

At least one herbaceous fuel management tool includes prescribed fire. See Robert W Gray, Dry Forest and Grassland Fire Regime Departure: Implications for Society and the Environment, Powerpoint Presentation, pp. 33-44, Oct. 15, 2005. This is described as a very beneficial and effective tool for grassland restoration. Id. However, when the treatment area is too small it can incur heavy ungulate use and as such, these prescribed fires may also be part of a "rest rotation" grazing management plan. Id. That is, to avoid over grazing of a given area, the area may be given a period of time to "rest" between grazing periods by preventing ungulates from grazing there. Additional treatments for wildfire fuels are discussed in the above presentation relating to heavy crown thinning without grazing and/or removal of ladder and surface fuels with grazing. Id. at 43-44. As such, it is implicit that herbaceous materials that may serve as surface fuel are reduced by ungulate populations that consume these as food; however, there is no discussion of how to direct such consumption. In the present invention, a reduction of such surface fuel, which can assist both in reducing risk of ignition and risk of high heat and rapid spread of a wildfire, can be addressed by directing and managing ungulate consumption of herbaceous fuels.

The behavior of the ungulates that can assist in reducing herbaceous fuels can be guided and shaped by placement of ingestible 206 as described above, i.e., an animal feed supplement that is highly-palatable, portable, and self-limiting. The animal feed supplement may attract the selected ungulate specie Us to a target area for fuel consumption and may increase the length of stay, or dwell time, of the selected ungulate specie Us in the target area. Depending on the water sources and bedding down location, the ingestible may also define one end of a grazing path that is followed by ungulates. In one embodiment, the feed supplement 206 is tailored for the nutritional needs of the selected ungulate specie Us and/or the taste preferences of the selected ungulate specie Us. In one embodiment, the animal feed supplement 206 is any of the CRYSTALYX® products previously discussed in this Detailed Description. The attraction of the ungulate to the ingestible may provide a mode for controlling and directing their location for reduction of herbaceous fuels. The self-limiting nature of the ingestible may extend its effective life and attractive power.

In one embodiment, the ingestible 206 is a chemical block, protein block, pressed block or liquid feed supplement. In one embodiment, the ingestible 206 is livestock cake, beet pulp, grain, silage, hay, or straw. In one embodiment, the ingestible 206 is a mineral block, granular mineral supplement, salt block, or granular salt supplement. The ingestible formulation may be tailored for nutritional needs of the selected ungulate group and/or taste preferences of the selected ungulate group. The ability to attract repeatedly and hold the ungulate is significant to enhance herbaceous fuel consumption, so the emphasis in ingestible formulation for this application may be on olfactory attractants and palatability where these might conflict with nutrition.

As indicated in the flow diagram depicted in FIG. 13 and as will be explained in greater detail later in this specification, in one embodiment, a method of reducing herbaceous fuels in areas susceptible to wildfires may include any one or more of the following steps or processes. A general region (e.g., a geographic area of any size, including a country, state, national park, ranch, preservation area, etc.) may be selected where susceptibility to wildfires is to be addressed. (block 400) An ungulate species (domestic and/or wild) Us available in or to the region may be selected to address overgrowth or under-foraged areas. (block 402) A reasonable area size may be determined, which may be used to divide up the region. (block 403) The general region may be analyzed to determine what areas are most susceptible to wildfires. (block 404) Criteria may be developed for prioritizing areas based on susceptibility to wildfire or desirability for protection of the area from wildfire or protecting the area's surroundings or addressing environmental concerns from wildfires, etc. (block 405) These criteria may identify areas that are most important to protect from wildfires and/or most important to protect other near-by or adjacent areas from wildfires. The areas may be individually prioritized. (block 406) The susceptible areas may be placed in an order to be addressed based on their individual priority concerns, ease of movement of a given ungulate population between areas, number of available ungulates, whether simultaneous treatment is available, etc. (block 408) An ingestible may be provided at a first deployment location in the area at the top of the order. (block 410) The selected ungulate may be introduced to the ingestible or the ungulate may otherwise be allowed or caused to enter the first deployment location. (block 412) The area may be monitored for herbaceous fuel reduction resulting from ungulate grazing. (block 414) An ingestible may be placed in a second deployment location that is next in order (block 416), and so on. In each wildfire susceptible area treated, the ungulate population, available amount of ingestible, and duration of availability of ingestible are selected to cause the ungulate population to consume the herbaceous fuels in the wildfire susceptible area in an amount sufficient to reduce the risk of wildfire in that area.

Figure 13:
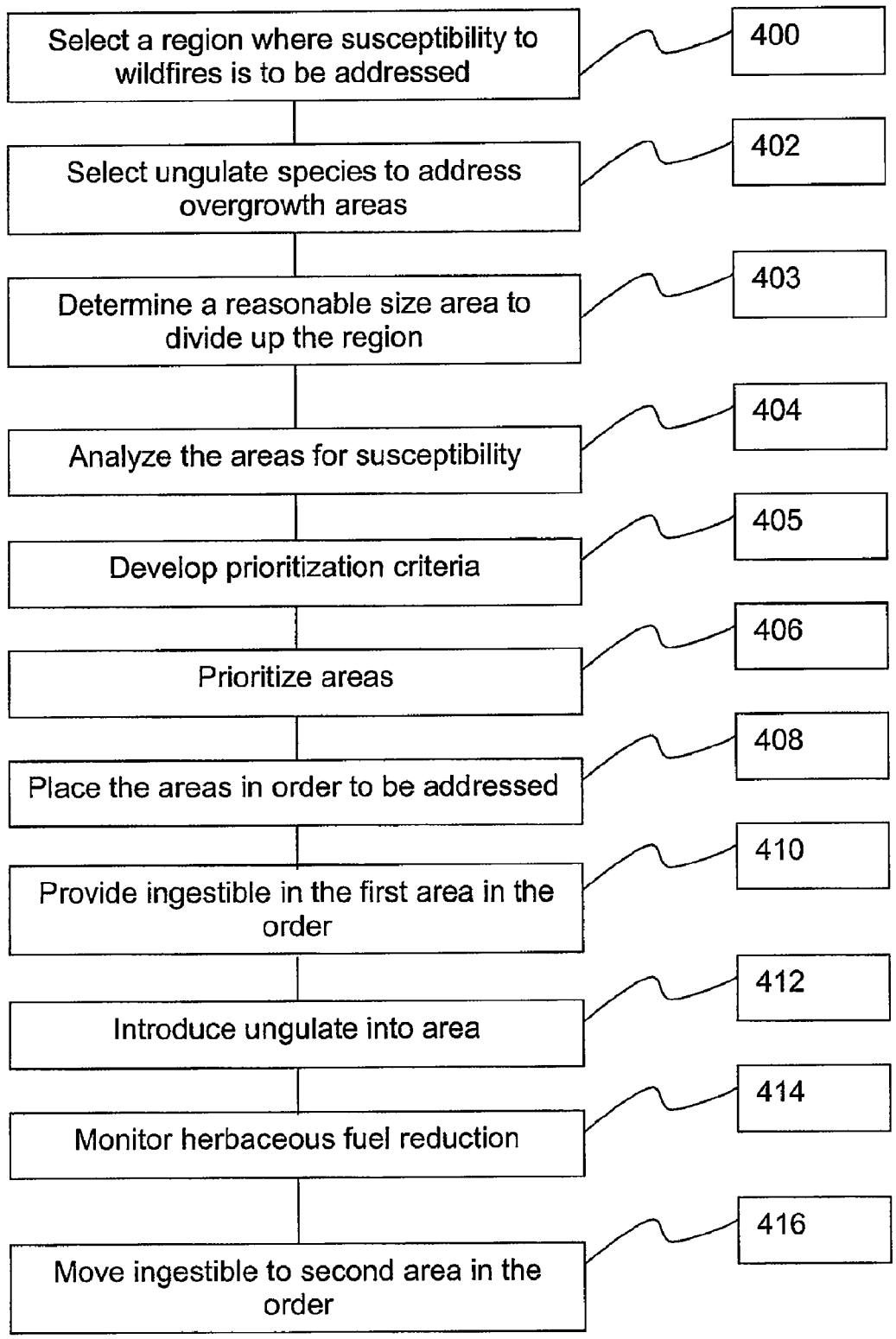
FIG. 13 is a flow diagram illustrating one embodiment of the method for reducing herbaceous fuels.
Figure 14:
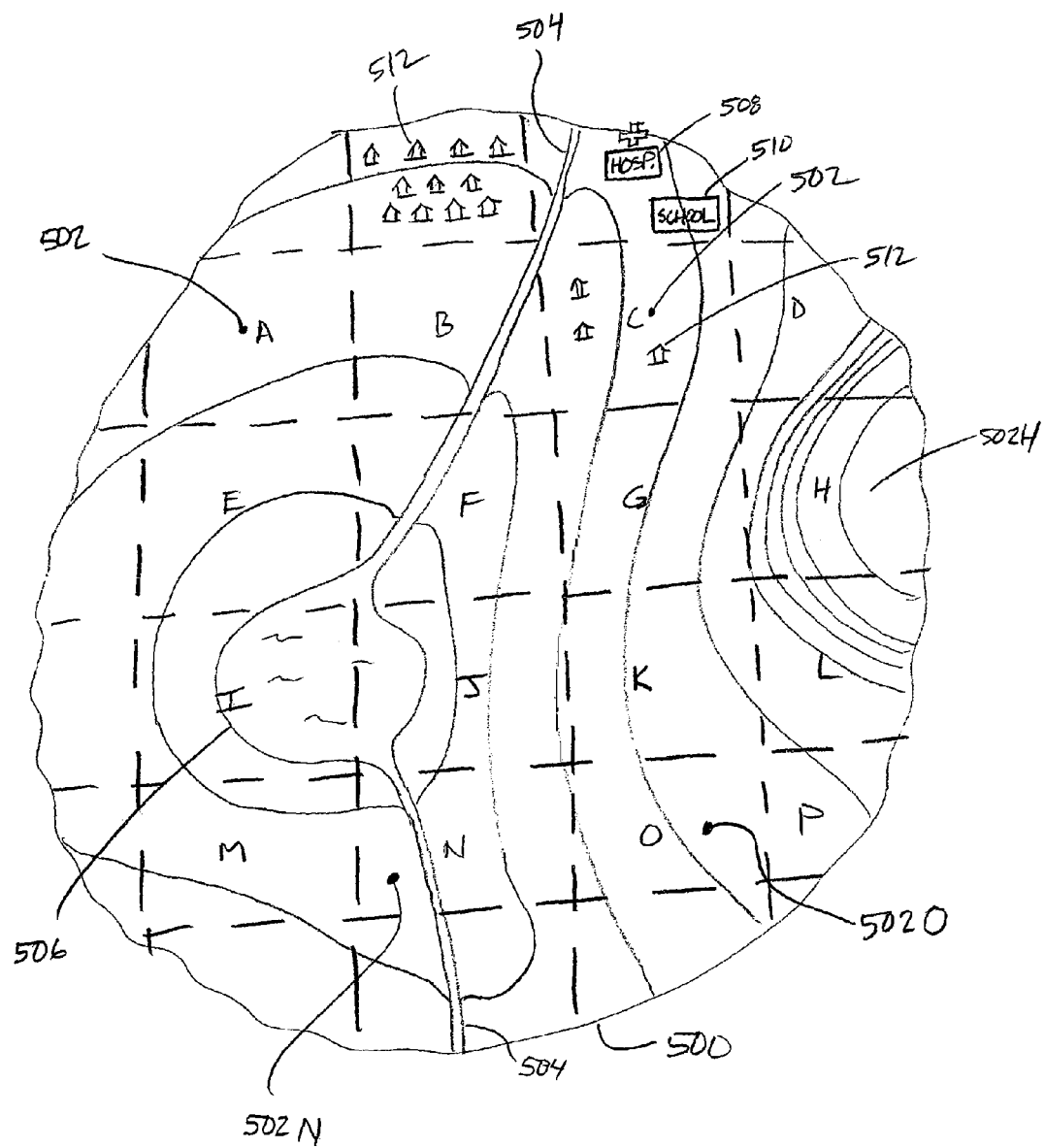
FIG. 14 is a topographic map showing a region and wildfire susceptible areas within the region according to certain embodiments.

For a more detailed discussion of the method outlined in FIG. 13, reference is made to FIGS. 14-20. FIG. 14 is a diagrammatic depiction of a general region. As mentioned, the general region 500 may range from a large region (e.g., a portion of a state or states) to a relatively small region (e.g., a park or forage area near homes or other buildings). A region 500 size may depend on several factors. For example, a large geographic area may be selected as a result of a global or national initiative to reduce wildfires, whereas a park or ranch or area near a building cluster may be selected on a more individual basis.

An ungulate species Us may be selected to address/reduce the herbaceous fuels in the region 500. This selection may depend, at least in part, on the region 500 selected, both with respect to size and location and ungulate availability. For example, in the case of a ranch, domestic ungulates may be appropriate and may include cattle, bison, buffalo, sheep, or other domestic ungulates. In the case of a national park, however, wild ungulates, such as elk, deer, or other wild ungulates may be appropriate. In some circumstances a combination of ungulates may be used. This may be the case where a region 500 is selected that encompasses lands inhabited by both wild and domestic ungulates. Additional consideration may be given to the overgrowth areas, what they are overgrown with, and which ungulates are most likely to perform the best in reducing the herbaceous fuels. For example, in mountainous regions, elk, moose, or sheep, may perform better than cattle. In fact, in certain remote locations, the native wild ungulates may be a unique agent used in control. In certain circumstances the ungulate may be able to access an area otherwise inaccessible by vehicle, such that use of the ungulates to control the herbaceous fuels may allow for fuel reduction that would otherwise go uncontrolled. For example, in mountainous or relatively rocky regions, the feasibility of accessing some areas may be limited, but the native ungulates may be accustomed to traversing the steep hills, cliffs, or other obstructions and thus may be used to control the fuel levels.

The region 500 may be divided up in to areas 502, where there is wildfire danger and the opportunity to reduce available fuel. The area size may be determined based on several factors. The area size may be dependent, at least in part, on the type of ungulate being used and the size of the herd of a given ungulate population. Consideration may be given to known stocking rates and carrying capacities to determine area sizes. As such, where herds in the region 500 are large, larger areas 500 may be used. Where the herds are separable, areas 502 may be reduced in size to allow for addressing multiple areas 502, which may be remote from one another, at a given time. This ability to address multiple areas 502 may provide flexibility in how and in what order the several areas are addressed within the region. The area size may also be determined, at least in part, on the ingestible being used and the quantity of ingestibles that are available. That is, the ability to control grazing of a given ungulate may be limited to a distance from the ingestible and/or by the location of the ingestible relative to a water source, bedding down area, or other habitual location for the ungulates within the area. Where the herd population is large, more than one or several ingestibles may be necessary in a given area 502 to maintain the ungulate interest and thus be able to better control their location. As such, a foraging manager may assign a reasonable number of ungulates that may be supported by a single ingestible. The area size may then be determined by the distance from the ingestible that the herd is expected to be. Additionally, for larger areas 502, one or more ingestibles may be used in one area 502 and may be spaced to allow for some overlap of the associated grazing areas, the total square area of the grazing areas defining the area 502 being addressed for susceptibility or opportunity for controlling wildfires. The areas 502 may be defined by developing a map with a grid system as shown in FIG. 14, or the areas 502 may be defined or partitioned for a map based on logical distinctions between adjacent areas 502 such as topography, property lines, ungulate type or population, or other logical differences.

With consideration given to the appropriate area size, after map definition, the areas 502 within the region 500 may be analyzed for susceptibility and opportunity for reducing fuels for wildfires. This analysis may involve consideration of several factors. On-site inspection, aerial photographs, surveys, or other information may be used to determine the level of overgrowth and the type of overgrowth. Due consideration may be given to geographical and topographical information. That is, climate differences due to geographical location within a region may cause certain areas to be generally hotter and/or drier than others and thus more susceptible. Topographically, higher areas 502, for example area 502N, may be drier and more susceptible, whereas lower areas 502, for example 502O, may be less dry and less susceptible. Some areas 502, for example 502N, may be in close proximity to rivers 504, lakes 506, or other wetland areas and may be generally less susceptible. Information about wind speeds and directions may be included. Areas 502 in higher wind zones may be more susceptible because they may be drier and more prone to spread of fire. Surrounding conditions may also be included in the susceptibility analysis. For example, areas 502 near or around highways, campgrounds, recreational areas, or other areas where fire may be started by carelessness, may be considered more susceptible. Any information about the areas 502 within the region may be relevant to an area's susceptibility to wildfire and may be included in the susceptibility analysis. The entity performing the analysis may give due consideration to consistent use of factors and may consider the same or similar factors for each area 502. An exemplary susceptibility table is shown in FIG. 15 pertaining to the areas 502 of region 500 in FIG. 14. Susceptibility has been shown as low, moderate, or high and has been based upon topography relating to high and low lying areas in addition to lake and river locations.

Criteria for prioritizing efforts to reduce herbaceous fuels in areas 502 may be developed. These criteria may depend, in part, on the susceptibility of each area 502. However, areas 502 may also be considered as important for economic, social, or other reasons. This importance may be based on a need to protect the area in question or on a need to control spread of fires to other areas, or both. These other areas may include inhabited areas that may or may not have ungulate populations. Such areas may not be suitable for encouraging foraging, but rather may be part of the plan for protection by encouraging adjacent foraging for reducing herbaceous fuels. In practice, highly susceptible areas 502 or those of greater importance for protection may have a higher priority. A balance may need to be struck between the risks associated with the susceptibility level of an area 502 and/or the value or importance of an area 502, when considering the effects on the area 502 itself and the surrounding areas 502, if a particular mapped area 502 were to burn. As such, in some cases, an area 502 with a high susceptibility may have a lower priority than an area 502 with a low or moderate level of susceptibility due to the need to reduce fuels in or around a more important area 502 (which may or may not be grazable) first. In addition, when developing prioritization criteria, consideration may be given to the known natural conditions of the region, such as the prevailing wind direction or moisture conditions. As such, upwind areas may be given a higher priority in an effort to cut-off the spread of fire.

In light of the above discussion, the prioritization criteria that are developed may depend on the type of region 500 being addressed, in that the foraging manager may have different goals depending on the scale of the operation and the sites within it. For example, on a national, state, county, or other relatively large level, where political leaders or those with more regional goals are making decisions, protection of populated areas and certain environments may be the basis for priority criteria. That is, on a large scale, regional goals may include protecting human populations, various community structures and the environment.

Regarding protecting human populations and community structures, an area with a relatively average level of susceptibility may be given a high priority if it is located near a populated residential area or near an area populated with more vulnerable individuals or essential facilities. (e.g. schools, nursing homes, hospitals, etc.) Importance factors similar to those used in building codes may be incorporated to adjust priority based on the importance of the building occupancies in an area 502 or surrounding areas. For example, design loads on buildings are often increased by 25% for essential facilities. In a similar fashion, the building occupancies in a given area 502 or surrounding area 502 as well as the number of buildings in or around an area 502 may be used to increase the priority of an area.

Regarding the environment, environmental concerns may relate to protecting animal habitats, lake quality, river quality, and possibly the resulting water supply. That is, after a fire, where forage and other plant life has been damaged, runoff may pollute rivers and lakes, adversely affecting a water supply and causing erosion. In this regional example, fuel reduction priority may be given to a moderately susceptible area over a highly susceptible area if the moderately susceptible area is strategic, e.g., important for protecting a source of water for a city or town. Additionally, wetland areas and those around them may be given a higher priority than other areas to protect the large number of species inhabited there.

In addition to considerations of populations, community structures, and the environment, practical considerations may be included. For example, the priority given to an area 502 may also be affected by its proximity to fire stations. Areas 502 in close proximity to fire fighting stations may have their priority for fuel reduction adjusted downward due to the ability of the fire fighting organization to react quickly and contain a fire if it were to ignite there.

On a relatively smaller or private level, for example a ranch, the prioritization criteria may be mainly determined based on the level of susceptibility of the various areas 502. However, due consideration may be given to the location of a residence relative to a susceptible area 502 or the location of neighboring residences, barns, and other structures to be protected. Additional consideration may be given to the openness of areas 502 and the ability of cattle or other animals to flee or escape. Fenced in areas 502, for example, may have a higher priority than non-fenced areas 502, but may still be subject to the susceptibility and importance analysis above. On this smaller scale, however, where decisions may be made by a single property owner, the interests of the property owner may be paramount over more regional goals. Each region or area may need to be reviewed on a case by case basis to develop appropriate prioritization criteria.

The prioritization criteria may be a blend of susceptibility and of protection importance for the area itself or areas adjacent to it, with weights attached to locations to be protected. Given the variables, an optimal plan serving all goals or interests may be difficult, even impossible to develop. However, any plan with reasonable prioritization may permit a region to act or suggest action to reduce at least some wildfire danger or destructive potential. In most larger areas, a plan will have to be carried out in steps because of resource limits. There may be cost limits on the number of ingestibles bought at any given time, limits on the personnel or transport to place the ingestibles, limitations on the number of ungulates or their expected rate of forage consumption, or limitations on movement of ungulate populations. When not all areas can be provided with an ingestible and an ungulate population to consume forage adjacent to or within a known attraction range of the ingestible, prioritization in use of ingestibles and ungulate populations may be needed. The prioritization criteria may be part of a program that identifies the ungulate population that will consume the herbaceous fuels and the ungulate populations grazing habits, the particular ingestible that will be effective to attract and hold the ungulate population, an expected consumption rate and expected duration of residence in the area, as well as any within-area movement of ingestibles, and planned monitoring of results.

The individual areas 502 of the region 500 may be prioritized. This may involve applying the prioritization criteria above to all or a subset of the areas 502 within a region 500 and placing each of the areas 502 on a priority list. That is, considering each area 502 individually, each area 502 may be assigned a priority relative to each of the other areas 502 without regard to how the program of reducing the herbaceous fuels may be implemented.

An exemplary priority list is shown in FIG. 16 pertaining to the areas 502 of region 500 shown in FIG. 14. In developing this list, while susceptibility to wildfire was considered, the priority also included consideration of surrounding area conditions and facilities. For example, while area C may have a moderate susceptibility, area C includes housing and is adjacent to an area with important facilities, such as a hospital and a school. As such, area C falls in the path of a potential wildfire that may harm this adjacent area. Area D was placed second on the priority list, because, while area B is adjacent to a residential area, area D is near the hospital and school area, falls in the path of a potential wildfire, and has a high susceptibility of wildfire. Area B has a low susceptibility for wildfire.

The susceptible and important areas 502 with assigned priorities may then be placed in order based on the practical aspects of addressing all areas 502. That is, a balance may need to be struck between addressing areas 502 with high priorities as early in the order as possible as well as making the process cost effective and efficient. This order may be based on several factors. For example, if the region 500 is large, several types of ungulates and several herds of each type of ungulate may be available to consume herbaceous fuels. While certain areas 502 may not be at the top of the priority list, the ability to use several herds of ungulates may allow, for example as shown in FIG. 17, the areas 502 with the top three priorities to be addressed simultaneously, thus placing all of these areas 502 at the top of the order. Subsequently, the next three areas 502 in the priority list may be addressed by placing these three areas 502 second in the order. It is noted that the number three is used as an example, and depending on the size of the region 500 and the number of ungulate herds available (and any need to move them), many more than three areas 502 may be addressed simultaneously and as few as one area 502 may be addressed at any given time. As shown in FIG. 19, an order is shown with one herd, and the order is based on the priority list of FIG. 16. It is noted that the order elects to address areas D, C, B, and A in a linearly progressing fashion. Then, rather than jump over to area G or H, which have high susceptibility levels, the order reflects addressing areas E and F on the way to areas G and H to avoid having to move the herd so drastically. As such, the low susceptibility areas E and F get addressed before the highly susceptible areas G and H. Such decisions may be left to the foraging manager with knowledge of the herd, the terrain, and the ability to move the herd.

If an entire county in a given state is being considered as a region 500, there may be one or more herds of domestic ungulates and/or one or more herds of wild ungulates being used to reduce herbaceous fuels. This may further affect the order of areas 502 where, for example, private herds may be limited to staying within property boundaries. In these cases, the areas 502 within the private lands may need to be isolated from the other areas 502 and addressed in their own order. That is, the area 502 within the private land with the highest priority may be addressed first and the area 502 with second to the highest priority may be addressed second and so on. This may cause areas 502 with low priority to be addressed well before areas 502 with higher priorities in the region 500, simply due to limitations on the herd resources and locations.

In addition to the size of the region 500, the number of herds being used, and the limitations on where those herds may graze, the order may be based, in part, on the practicality of moving a given herd and the ingestible from one area 502 to another. That is, areas 502 may be placed in order to make transitioning from one area 502 to another feasible, fluid, and efficient. This may mean that areas 502 may be placed in order by limiting the transition, from one area 502 to another, to adjacent areas 502.

For example, as shown in FIG. 18, with due consideration to the priority list, a logical order is shown, different from that in FIG. 17, which transitions from one area 502 to another 502, without skipping adjacent areas. As such, movement of the ingestible from one area to an adjacent area may be sufficient to cause the herd to follow the ingestible and relocate without additional efforts such as herding, hauling, or otherwise forcing the relocation of the herd. Rather than not skipping over any adjacent areas 502, the transition from one area 502 to another area 502 may be limited to skipping over a maximum of one area 502, or two areas 502, and so on. In these instances, consideration may be given to the travel path of the herd. That is, some fuel reduction may occur along the path of travel that may reduce susceptibility of some areas 502 and may allow for changing the priority and/or order of when those areas 502 will be addressed. In any event, the manager may choose to avoid skipping back and forth across a region 500, which may be inefficient. For example, in FIG. 17, while several available herds may have been taken advantage of, the order may not be logical. That is, herd III is shown to move from area B to area H. In FIG. 18, the second set of areas to be addressed has been modified to better accommodate movement of the herds. As such, herd I moves from area C to G, herd II from D to H, and herd III from B to A, and in all cases, the herds are moving to an immediately adjacent area. The foraging manager may choose the order based on knowledge of the ability to move the herd, the terrain involved, the cost and effort to place and/or move the supplement, and so on. For example, domestic ungulates may be herdable or haulable, while wild ungulates may not be. Obstacles such as lakes 506, rivers 504, cliffs, or other topographical features may also be considered in this ordering process. In FIG. 19, where only one herd is being used, the order of areas J through I were selected to appropriately navigate around the lake 506 shown in FIG. 14. Other factors may be included in placing the prioritized areas 502 in an order that makes sense for the given region 500, such as the creation of protection zones around important facilities.

With a plan in place, the process of reducing fuels may begin by displacing the ungulates to the first deployment location. This displacement may occur in one or a combination of several ways. Where the ungulates are already in close proximity to the first deployment location or are already in the first deployment location, this displacement may occur on a smaller level by placing an ingestible in the first deployment location causing the ungulates to be attracted and stay there. In another embodiment, the displacement may include systematically leading the ungulates to the first deployment location. That is, an ingestible may be placed near the current location of the herd or near a central location of known grazing areas of several ungulates. This may be done to initially attract the ungulates to the ingestible. This location may also be on a path toward the first deployment location. This first location may be within sight or smell of the herd or ungulate population so as to attract the herd to the ingestible. Once the herd or group of ungulates moves to the ingestible, the ingestible may be moved an additional distance along the path toward the first deployment location and so on until the first deployment location is reached by the herd. In another embodiment, the displacement may take the form of hauling one or several herds to the first deployment location. In another embodiment, one or several herds may be herded to the first location. In still another embodiment, the displacement may include placing the ingestible at a first deployment location and an extended time may be allotted for this first location to allow time for initial congregation of the surrounding ungulates. Other displacement methods may be used to physically move or otherwise focus the grazing of the ungulates at the first deployment location.

One or more ingestibles may be provided at a first deployment location in the area 502 at the top of the order. The number and location of ingestibles may depend on the size of the area 502 and the number of ungulates in the area 502. Also, the ingestibles may be positioned within the area 502 to allow for equivalence of consumption as discussed above. The selected ungulate may be introduced to the ingestible or the ungulate may otherwise be allowed or caused to enter the first deployment location.

The area 502 may be actively monitored for herbaceous fuel reduction or predetermined grazing periods may be determined. Active monitoring may involve measuring the length of grasses or otherwise measuring the area 502 to quantify the herbaceous fuel present and the progress of reduction. Subject to changes in priority, an area 502 being addressed may continue to be addressed until its susceptibility is reduced to an acceptable level. That is, where the herbaceous fuels are reduced and the susceptibility to wildfire is reduced to an acceptable level, the ingestible and the herd may be removed from that area 502. This may occur by removing the ingestible and placing it in the next area in the order causing the herd to follow the ingestible. Other methods of moving the herd, as discussed above may also be used. In the case of predetermined grazing periods, specific amounts of an ingestible may be placed in an area based a known carrying capacity of the area in comparison to the stocking rate as well as a known consumption rate of the ingestible. As such, after a given time, the ingestible may run out and the herbaceous fuel in the area may also be reduced to an acceptable level. The ungulates may then move on to the next location where an ingestible is located because the ingestible in the current area is no longer providing an attraction. It is noted that while herbaceous fuels may be reduced, over-foraging an area 502 may cause it to be prone to erosion. To address under-foraged and over-foraged areas 502, the ingestible may be moved around within the area 502 to control the local intensity of foraging taking place. Additionally, reduction of noxious or invasive plants may be addressed by ingestible placement within a given area 502 together with reducing herbaceous fuels.

The ingestible used in one area (if not fully consumed) or a fresh ingestible may be placed in a second deployment location, which is next in order, and so on. In some embodiments, the ingestible container may be biodegradable and thus removal of the empty ingestible container (see e.g., U.S. Pat. No. 6,337,097) from an area may not be required. Placement of an additional ingestible at a new location may attract the herd to the new ingestible once the previous ingestible has run out or is no longer supporting the herd. It is noted that a transition of an ungulate group from one area to another may occur when the herbaceous fuel in the first location has been reduced to an acceptable level or where, for some reason as discussed below, the second location has been moved up in the order. The process may continue and areas 502 may be treated as they come up in the order until the entire region 500 has been addressed.

In some embodiments, all areas 502 within a region 500 may be addressed more quickly, by addressing each area 502 for a shorter period of time. Where, for example, many areas 502 may be considered highly susceptible, a foraging manager, may choose to address each area 502 for a shorter period of time to reduce the herbaceous fuels to a less susceptible level. A second pass through the region 500, may then be used to further reduce the fuels. Additional passes may also be made and continual or repeated passes through a region 500, with associated monitoring of herbaceous fuel reduction, may be planned to address seasonal regrowth. In other embodiments, an expected wildfire path to an important area may get intense forage focus to cause a possible interruption of the expected wildfire path. This may include the creation of protection zones such as wide reduced-fuel swaths along a side of a region to prevent wildfires from moving across the swath. Another type of protection zone may include encircling an important area with herbaceous fuel reduction efforts, to surround the area with a buffer zone preventing or reducing the chance that a wildfire will reach the important area. Other protection zones may include grids of rows or patches to interrupt the spread of wildfire. Consideration may be given to achieving defensible zones as described at www.ext.colostate.edu/pubs/natres/06302.pdf. This article describes a zone 1, in close proximity to structures (e.g., within 15 feet), where all flammable vegetation may be removed. It also describes a zone 2, positioned beyond the boundary of zone 1 (e.g., from the edge of zone 1 to a distance from 75 to 125 feet away from the structure) where grasses are reduced to keep them low, a maximum of 6-8 inches; in addition, stressed, diseased, dead, or dying trees and shrubs are removed and larger trees and shrubs are thinned and pruned. In light of this, protection zones near populated or otherwise important areas may have the herbaceous fuels reduced more drastically, than areas more remote from these areas.

An exemplary implementation over a six week period is shown in FIG. 20 based on the order shown in FIG. 18. As shown, herd I, herd II, and herd III, may first be displaced to areas C, D, and B respectively, by placement of an ingestible in each of these areas. After week 1, the ingestible may be moved or may have been previously portioned to run out after the first week. Consideration may be given to the stocking rate and carrying capacity of each of the areas such that the herds' week long stay in the areas may result in an acceptable fuel reduction of each of the areas. That is, with a known carrying capacity of the areas, the herd sizes may be adjusted to appropriately address the available fuel in each area for one week. The herd sizes may be adjusted by increasing or decreasing the number of ingestibles or where the areas are not in close proximity, certain of the ungulates may be herded, hauled, or otherwise encouraged to go to a specific area. In week 2, herds I, II, and III, may move to areas G, H, and A, respectively. The ingestible in the previous areas may be moved as discussed above or placed in a biodegradable container and allowed to naturally dissolve when empty. Over the period of six weeks, as is apparent from FIG. 20, the region 500 may be addressed with the three herds. In week 6, herds II and III may join herd I in area I. Alternatively, they may be placed at the beginning of the order to re-complete the cycle. Where they join herd I, the week may be cut short due to a high stocking rate in one area. In still another example, areas J, M, N, and I may be re-organized into three areas and addressed in week 5 to better accommodate the use of three herds.

All area priorities and order may be continually evaluated based on the length of time required to reduce herbaceous fuels when a given ungulate population is present, increasing or decreasing susceptibility of the current area 502 or other areas 502, etc. In one example, an area 502 may have a moderate level of susceptibility and be placed near the middle of the priority list. Conditions may change and, for example, a fireworks display may be planned near or around a given area 502 or a dry spell may occur. This may cause its susceptibility to increase. The foraging manager may increase this area's place in the order accordingly. In another example, where the length of time to reduce available herbaceous fuel is relatively long, other areas 502 where no foraging may be occurring may continue to grow and produce fuels, causing these areas 502 to become more susceptible. The foraging manager may thus move these areas 502 up in the order. A review of the priority and order of each of the areas 502 may be scheduled weekly, monthly, quarterly, annually, or any other period which makes sense for the region 500. Additionally, certain events or conditions may be cause for individual consideration and may not be allowed to wait for a periodic review. These events or conditions may include a drought, a pattern of arson, or anything that affects an area's susceptibility to wildfire that was not considered in the original analysis or anything that changes a factor previously considered.

The reduction in herbaceous fuels by a planned program of placing ingestibles to guide herbaceous fuel consumption by ungulate populations meets a wildfire risk reduction need that otherwise may go unmet due to terrain or expense or that may otherwise be addressed with herbicides, plowing, or other less desirable interventions. The ability to direct available domestic or wild ungulate populations to the fuel reduction task is a largely environmentally friendly way to reduce wildfire dangers including both occurrence and destructiveness. In addition, the health of the ungulate population can be addressed simultaneously by various formulations of the ingestible.

Although the present invention has been described with reference to preferred embodiments, persons skilled in the art will recognize that changes may be made in form and detail without departing from the spirit and scope of the invention.

What is claimed is:

1. A method of reducing herbaceous fuels consistent with a predetermined plan, the plan including a map of a region divided into wildfire susceptible areas and including an order for addressing the areas, the method comprising:
   developing the predetermined plan, wherein developing the predetermined plan comprises:
      developing an area map with a plurality of regions and identification by region of the available ungulate populations and herbaceous fuels for fueling a wildfire;
      identifying a region on the map with herbaceous fuels to be reduced;
      dividing the region into wildfire susceptible areas; and
      placing the wildfire susceptible areas in an order for reduction of fuel;
   introducing an ingestible palatable to an available ungulate population in at least a first wildfire susceptible area in the order; and
   displacing the ungulate population to the at least a first wildfire susceptible area, the ungulate population being attracted to consume the herbaceous fuels in the at least a first wildfire susceptible area in an amount sufficient to reduce the risk of wildfire in that area.

2. The method of claim 1, wherein placing the susceptible areas in an order includes analyzing the susceptible areas for a level of susceptibility.

3. The method of claim 1, wherein placing the susceptible areas in an order includes developing prioritization criteria.

4. The method of claim 3, wherein placing the susceptible areas in an order includes prioritizing the susceptible areas based on the prioritization criteria.

5. The method of claim 1, wherein placing the susceptible areas in an order includes considering practical aspects of treating all of the susceptible areas of the region.

6. The method of claim 1, wherein dividing the region into susceptible areas includes dividing the region with a grid.

7. The method of claim 1, wherein dividing the region into susceptible areas includes identifying logical distinctions between adjacent susceptible areas within the region.

8. A method of reducing herbaceous fuels consistent with a predetermined plan, the plan including a map of a region divided into wildfire susceptible areas and including a prioritized order for addressing the areas, the method comprising:
   introducing an ingestible palatable to an available ungulate population in at least a first wildfire susceptible area in the order;
   displacing the ungulate population to the at least a first wildfire susceptible area, the ungulate population being attracted to consume the herbaceous fuels in the at least a first wildfire susceptible area in an amount sufficient to reduce the risk of wildfire in that area; monitoring a level of susceptibility of each susceptible area and
   re-prioritizing the susceptible areas based on the level of susceptibility and changes in each area's conditions and surroundings.

9. The method of claim 8, further comprising updating the prioritized order.

10. A method of reducing herbaceous fuels consistent with a predetermined plan, the plan including a map of a region divided into wildfire susceptible areas and including an order for addressing the areas, the method comprising:
   introducing an ingestible palatable to an available ungulate population in at least a first wildfire susceptible area in the order;
   displacing the ungulate population to the at least a first wildfire susceptible area, the ungulate population being attracted to consume the herbaceous fuels in the at least a first wildfire susceptible area in an amount sufficient to reduce the risk of wildfire in that area; and monitoring a level of susceptibility of each susceptible area, wherein the monitoring includes periodic monitoring.

11. The method of claim 10, further comprising moving the ingestible to a second susceptible area in the order.

12. The method of claim 10, wherein the ingestible is portioned to hold the ungulate population for a predetermined time.

13. The method of claim 12, further comprising introducing a second ingestible palatable to an available ungulate population in at least a second wildfire susceptible area in the order and causing the ungulate population to be attracted to and consume the herbaceous fuel in the at least a second wildfire susceptible area thereby reducing the risk of wildfire in that area.

14. The method of claim 10, further comprising selecting an ungulate group.

15. The method of claim 14, wherein the ungulate group includes a domestic ungulate.

16. The method of claim 14, wherein the ungulate group includes a wild ungulate.

17. The method of claim 14, wherein the ungulate group includes domestic and wild ungulates.

18. The method of claim 10, wherein the ingestible is a feed supplement.

19. The method of claim 18, wherein the feed supplement is tailored for at least one of nutritional needs of the selected ungulate group and taste preferences of the selected ungulate group.

20. The method of claim 10, wherein the ingestible is a highly palatable, portable, self-limiting, animal feed supplement.

21. The method of claim 10, wherein the ingestible is selected from the group consisting of chemical blocks, protein blocks, pressed blocks and liquid feed supplements.

22. The method of claim 10, wherein the ingestible is selected from the group consisting of water, livestock cake, beet pulp, grain, silage, hay, and straw.

23. The method of claim 1, wherein the ingestible is selected from the group consisting of mineral blocks, granular mineral supplements, salt blocks, and granular salt supplements.

24. The method of claim 10, wherein the ingestible is in a biodegradable container.

25. The method of claim 10, wherein displacing the ungulate population to the at least a first wildfire susceptible area comprises one of systematically leading the ungulates to the at least a first wildfire susceptible area, hauling a herd of ungulates to the at least a first wildfire susceptible area, and attracting the ungulate population to the at least a first wildfire susceptible area.

26. A method of reducing herbaceous fuels consistent with a predetermined plan, the plan including a map of a region divided into wildfire susceptible areas and including an order for addressing the areas, the method comprising:

introducing an ingestible palatable to an available ungulate population in at least a first wildfire susceptible area in the order;

displacing the ungulate population to the at least a first wildfire susceptible area, the ungulate population being attracted to consume the herbaceous fuels in the at least a first wildfire susceptible area in an amount sufficient to reduce the risk of wildfire in that area; and monitoring a level of susceptibility of each susceptible area, wherein the monitoring includes consideration of individual conditions or events for an area.

\* \* \* \* \*

UNITED STATES PATENT AND TRADEMARK OFFICE
CERTIFICATE OF CORRECTION

PATENT NO.       : 8,146,539 B2
APPLICATION NO.  : 12/433331
DATED            : April 3, 2012
INVENTOR(S)      : Mark Allen Robbins It is certified that error appears in the above-identified patent and that said Letters Patent is hereby corrected as shown below:

| Column | Line | | Should Read |
|---|---|---|---|
| 19 | 24 | "Us" | --$U_s$-- |
| 19 | 26 | "Us" | --$U_s$-- |
| 19 | 31 | "Us" | --$U_s$-- |
| 19 | 31 | "Us" | --$U_s$-- |
| 19 | 33 | "Us" | --$U_s$-- |
| 19 | 34 | "Us" | --$U_s$-- |
| 21 | 59 | "Us" | --$U_s$-- |
| 21 | 62 | "Us" | --$U_s$-- |
| 21 | 66 | "Us" | --$U_s$-- |
| 22 | 1  | "Us" | --$U_s$-- |
| 22 | 8  | "Us" | --$U_s$-- |
| 22 | 9  | "Us" | --$U_s$-- |
| 23 | 4  | "Us" | --$U_s$-- |
| 23 | 6  | "Us" | --$U_s$-- |
| 23 | 10 | "Us" | --$U_s$-- |
| 23 | 11 | "Us" | --$U_s$-- |
| 23 | 40 | "Us" | --$U_s$-- |
| 24 | 16 | "Us" | --$U_s$-- |

Signed and Sealed this
Thirty-first Day of July, 2012

David J. Kappos
*Director of the United States Patent and Trademark Office*